(12) United States Patent
Takano

(10) Patent No.: US 10,078,394 B2
(45) Date of Patent: Sep. 18, 2018

(54) LIQUID CRYSTAL DISPLAY DEVICE HAVING PIXELS WITH MEMORIES

(71) Applicant: Japan Display Inc., Tokyo (JP)

(72) Inventor: Daijiro Takano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/298,782

(22) Filed: Oct. 20, 2016

(65) Prior Publication Data

US 2017/0115810 A1    Apr. 27, 2017

(30) Foreign Application Priority Data

Oct. 23, 2015   (JP) .................. 2015-209034

(51) Int. Cl.
| | |
|---|---|
| G06F 3/041 | (2006.01) |
| G06F 3/044 | (2006.01) |
| G09G 3/36 | (2006.01) |
| G02F 1/1333 | (2006.01) |
| G02F 1/1362 | (2006.01) |
| G02F 1/1335 | (2006.01) |
| G02F 1/1343 | (2006.01) |
| G02F 1/1368 | (2006.01) |

(52) U.S. Cl.
CPC ........ *G06F 3/0416* (2013.01); *G02F 1/13338* (2013.01); *G02F 1/136286* (2013.01); *G06F 3/044* (2013.01); *G06F 3/0412* (2013.01); *G09G 3/3677* (2013.01); *G02F 1/1368* (2013.01); *G02F 1/133345* (2013.01); *G02F 1/133514* (2013.01); *G02F 1/133528* (2013.01); *G02F 1/134309* (2013.01); *G02F 2001/134345* (2013.01); *G02F 2201/123* (2013.01); *G09G 2310/0283* (2013.01)

(58) Field of Classification Search
None
See application file for complete search history.

(56) References Cited

U.S. PATENT DOCUMENTS

| | | | |
|---|---|---|---|
| 2004/0066364 A1* | 4/2004 | Toyozawa | G09G 3/3659 345/98 |
| 2012/0162594 A1* | 6/2012 | Tamaki | G02F 1/13624 349/139 |

(Continued)

FOREIGN PATENT DOCUMENTS

| | | |
|---|---|---|
| JP | 2011-095496 A | 5/2011 |
| JP | 2011-118307 A | 6/2011 |

*Primary Examiner* — Ryan A Lubit
(74) *Attorney, Agent, or Firm* — Michael Best & Friedrich LLP

(57) ABSTRACT

A liquid crystal display device includes: a display unit configured to pixels in a display region, a pixel drive circuit configured to apply voltage to liquid crystals, a memory configured to store therein a setting signal indicating whether to apply voltage to the liquid crystals in the display region, and two switch elements for switching coupling with the pixel drive circuit; and a controller configured to rewrite the setting signal stored in the memory when a mode in which the display unit is operated is switched, between a first mode causing the display unit to perform display output in accordance with a gradation signal generated based on image data, and a second mode causing the display unit to perform display output in accordance with the setting signal stored in the memory.

13 Claims, 34 Drawing Sheets

(56) References Cited

U.S. PATENT DOCUMENTS

2014/0285761 A1* 9/2014 Tamaki ................ G09G 3/2074
   349/144
2016/0266699 A1* 9/2016 Zhao .................... G09G 3/3677

* cited by examiner

LIQUID CRYSTAL DISPLAY DEVICE HAVING PIXELS WITH MEMORIES

CROSS-REFERENCE TO RELATED APPLICATIONS

This application claims priority from Japanese Application No. 2015-209034, filed on Oct. 23, 2015, the contents of which are incorporated by reference herein in its entirety.

BACKGROUND

1. Technical Field

The present invention relates to a liquid crystal display device.

2. Description of the Related Art

A conventionally known liquid crystal display device performs display by supplying potential that a digital memory element holds to a liquid crystal cell of a pixel (for example, Japanese Patent Application Laid-open Publication No. 2011-118307 A). Such a display output method using what is called a memory function tends to be superior in power saving capability compared to a display output method of updating voltage applied to the liquid crystal cell in accordance with a gradation signal in each frame.

A digital memory element disclosed in Patent Literature 1 can switch only the turning on and off of the pixel, but cannot have gradation capability in three values or more. However, higher gradation output has been desired in response to requirements for the liquid crystal display device having the memory function.

The present invention intends to solve the above-described problem, and it is an object thereof to provide a liquid crystal display device that can achieve the memory function and a display output function having gradation capability at two values or more. It is another object of the present invention to provide a liquid crystal display device that can perform switching between display output using the memory function and display output using gradation capability at two values or more.

SUMMARY

A liquid crystal display device according to one aspect includes a display unit configured to pixels in a display region, a pixel drive circuit configured to apply voltage to liquid crystals, a memory configured to store therein a setting signal at least in one bit indicating whether to apply voltage to the liquid crystals in the display region, and two switch elements of a first switch and a second switch for switching coupling with the pixel drive circuit, and a controller configured to rewrite the setting signal stored in the memory when a mode in which the display unit is operated is switched, between a first mode causing the display unit to perform display output in accordance with a gradation signal generated based on image data in the case of turning on one of the two switch elements, and a second mode causing the display unit to perform display output in accordance with the setting signal stored in the memory in the case of turning on any one of the two switch elements.

BRIEF DESCRIPTION OF THE DRAWINGS

FIG. 6 is a diagram illustrating the process of mode change after the liquid crystal display device is turned on;

FIG. 7 is a diagram illustrating an operation state of each component of the pixel drive circuit and the MIP circuit before the liquid crystal display device changes to WMA or WMM after being turned on;

FIG. 8 is a timing chart schematically illustrating the potentials of a signal line, a counter electrode, a scanning line, a second scanning line, and a wire before the liquid crystal display device changes to WMA or WMM after being turned on;

DETAILED DESCRIPTION

Figure 1:
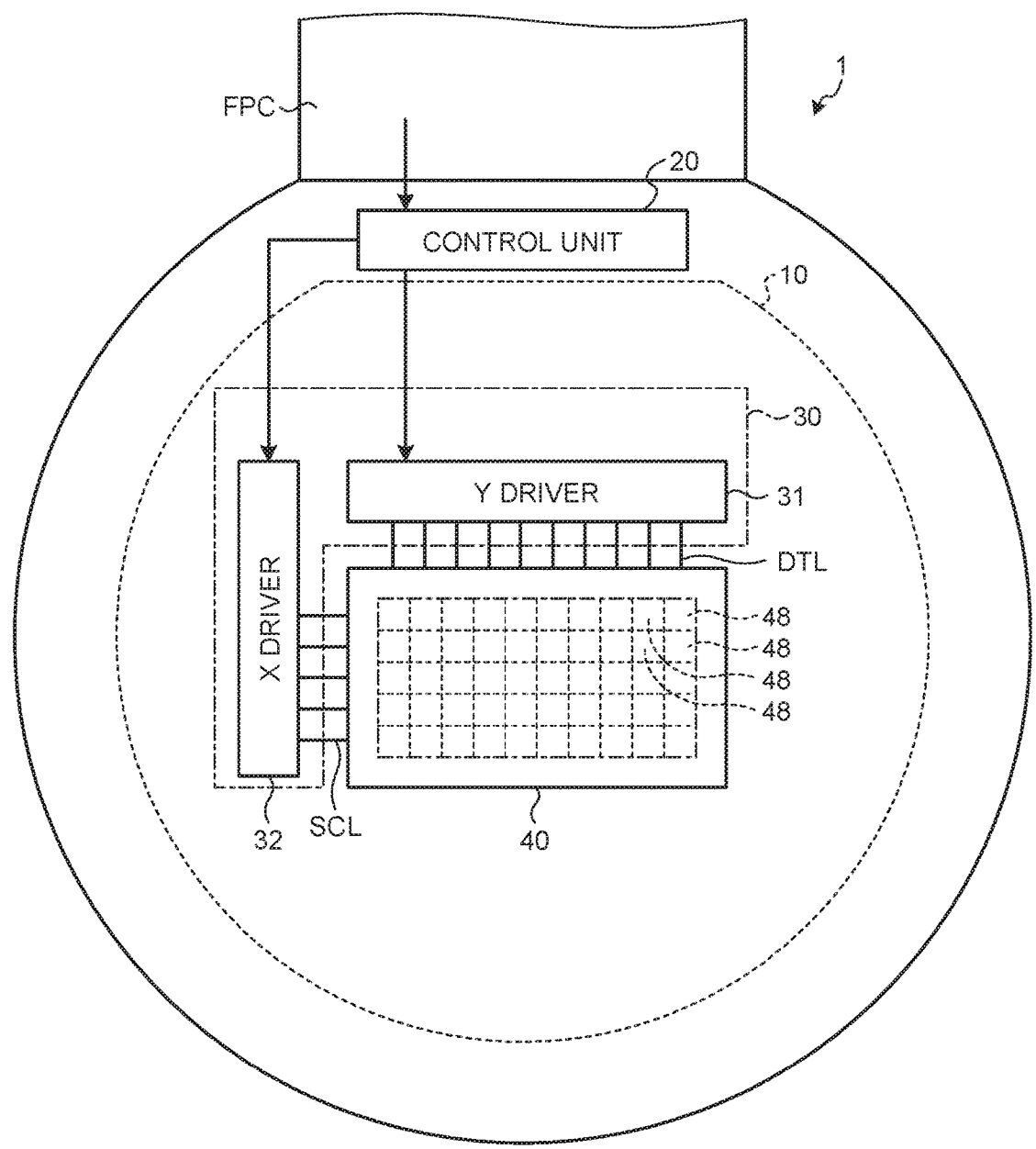
FIG. 1 is a diagram illustrating an exemplary configuration of a liquid crystal display device according to a first embodiment of the present invention.

Embodiments of to the present invention will be described below with reference to the accompanying drawings. The present disclosure is merely exemplary, and thus the present invention includes any modification that could be easily thought of by the skilled person in the art as appropriate without departing from the scope of the invention. Some drawings schematically illustrate the width, thickness, shape, and the like of each component differently from the actual aspect for clearer description, but are merely exemplary and do not limit the interpretation of the present invention. In the present specification and the drawings, any element same as that described with reference to an already described drawing is denoted by the same reference numerals and symbols, and detailed description thereof will be omitted as appropriate in some cases.

First Embodiment

Figure 2:
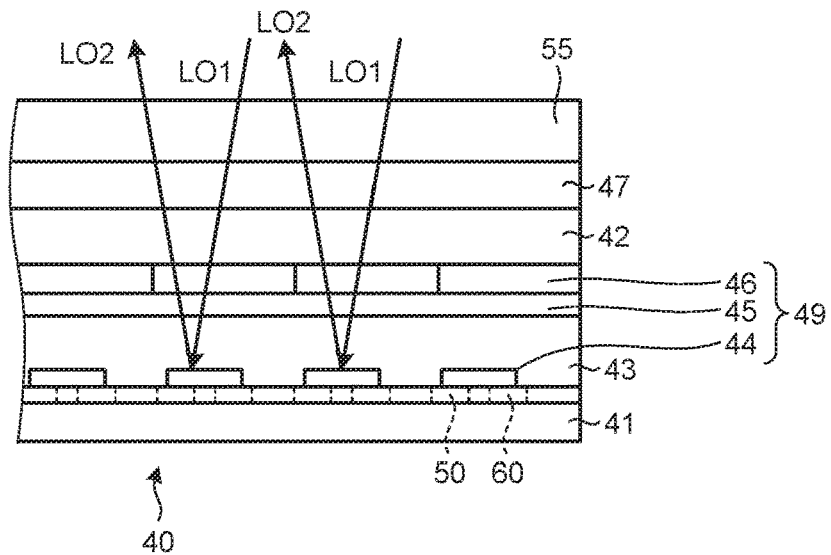
FIG. 2 is a sectional view schematically illustrating the structure of a display unit according to the first embodiment.

FIG. 1 is a diagram illustrating an exemplary configuration of a liquid crystal display device according to a first embodiment of the present invention. FIG. 2 is a block diagram of an exemplary configuration of a liquid crystal display device 1 according to the first embodiment. The liquid crystal display device 1 includes a display unit 10 and a control unit 20. The liquid crystal display device 1 displays an image by reflecting external light through the display unit 10. Specifically, for example, as illustrated in FIG. 1, the liquid crystal display device 1 includes the display unit 10 that includes a display panel 40 on which a plurality of unit pixels 48 are provided in a matrix along row and column directions, and the control unit 20 that is a circuit configured to perform various kinds of control related to display outputting by the display unit 10 through a LCD driver 30 configured to operate a pixel 49 (refer to FIG. 2) included in each unit pixel 48 of the display panel 40. The liquid crystal display device 1 includes an externally extended FPC, and is capable of performing display in accordance with image data output from an external device coupled through the FPC. The liquid crystal display device 1 according to the first embodiment is a reflective liquid crystal display device, but may be a transmissive or transflective liquid crystal display device.

FIG. 2 is a sectional view schematically illustrating the structure of the display unit 10 according to the first embodiment. As illustrated in FIG. 2, the display unit 10 includes a pixel substrate 41 and a counter substrate 42, both facing each other, and a liquid crystal layer 43 provided between the pixel substrate 41 and the counter substrate 42 and encapsulating liquid crystal elements.

The pixel substrate 41 is provided with a plurality of pixel electrodes 44 on one of its surfaces closer to the liquid crystal layer 43. Each pixel electrode 44 is coupled with a signal line DTL through a switching element, and receives application of a gradation signal as an image signal or a one-bit signal as a setting signal. The pixel electrode 44 is, for example, a reflective member made of aluminum or silver, and reflects external light. In other words, in the first embodiment, each pixel electrode 44 serves as a reflective unit that displays an image by reflecting light entering through a front surface as a display surface of the display unit 10. The reflective unit may be formed as any layer that is different from the pixel electrodes 44 as long as the reflective unit is arranged closer to the pixel substrate 41 than the liquid crystal layer 43. In this case, the pixel electrodes 44 may be formed of a transparent conductive material such as indium tin oxide (ITO) instead of a reflective material. The pixel substrate may be provided with a polarization plate on the other of its surfaces farther from the liquid crystal layer 43.

The counter substrate 42 is a transparent substrate made of, for example, glass. The counter substrate 42 includes a counter electrode 45, a color filter 46, a polarization plate 47, and a light guiding plate 55. The color filter 46 may be formed on the pixel substrate 41.

The counter electrode 45 is made of a transparent conductive material such as ITO or indium zinc oxide (IZO). The counter electrode 45 is coupled with the switching element coupled with each pixel electrode 44. The pixel electrode 44 and the counter electrode 45 are provided facing each other, and thus the pixel electrode 44 and the counter electrode 45 generate an electric field in the liquid crystal layer 43 when voltage is applied therebetween by the gradation signal. The electric field generated in the liquid crystal layer 43 twists the liquid crystal elements and changes a birefringence index. This allows the liquid crystal display device 1 to adjust the quantity of light reflected by the display unit 10. The display unit 10 in the first embodiment is what is called a vertical electric-field type, but may be a horizontal electric-field type in which an electric field is generated in a direction parallel to the display surface of the display unit 10. More specifically, the counter electrode 45 may be provided on the pixel substrate 41, and arranged above, within, or below the pixel electrode 44 through an insulating layer. The counter electrode 45 may be made of a reflective material and have a function as a reflective unit.

The color filters 46 is provided for each pixel electrode 44. The counter substrate 42 is provided with the polarization plate 47 and the light guiding plate 55 on one of its surfaces farther from the liquid crystal layer 43. The polarization plate 47 is a transparent plate or film made of, for example, cellulose triacetate (TAC) resin or polyvinyl alcohol (PVA) resin. The polarization plate 47 adjusts the polarization angles of external light LO1 entering from the outside of the display panel 40 and light LO2 emitted from the display panel 40. The light guiding plate 55 is a transparent plate made of, for example, acrylic resin, polycarbonate (PC) resin, or methyl-methacrylate-styrene copolymer (MS resin). The light guiding plate 55 is provided with prism fabrication on one of its surfaces (upper surface) farther from the counter substrate 42. The light guiding plate 55 adjusts the directions of the external light LO1 entering from the outside of the display panel 40 and the light LO2 emitted from the display panel 40.

The following describes reflection of light by the display unit 10. As illustrated in FIG. 2, the external light LO1 is incident on the display panel 40. The external light LO1 is incident on the pixel electrodes 44 through, for example, the light guiding plate 55, the polarization plate 47, the counter substrate 42, and the color filter 46. The external light LO1 incident on the pixel electrodes 44 is reflected by the pixel electrodes 44 and externally emitted as the light LO2.

In other words, each pixel electrode 44 externally reflects the external light LO1 incident on the display unit 10 through the front surface of the display unit 10. The externally reflected light LO2 passes through the liquid crystal layer 43 and the color filter 46. Accordingly, the liquid crystal display device 1 can display an image by the externally reflected light LO2. With this configuration, the liquid crystal display device 1 according to the first embodiment is a reflective liquid crystal display device.

Figure 3:
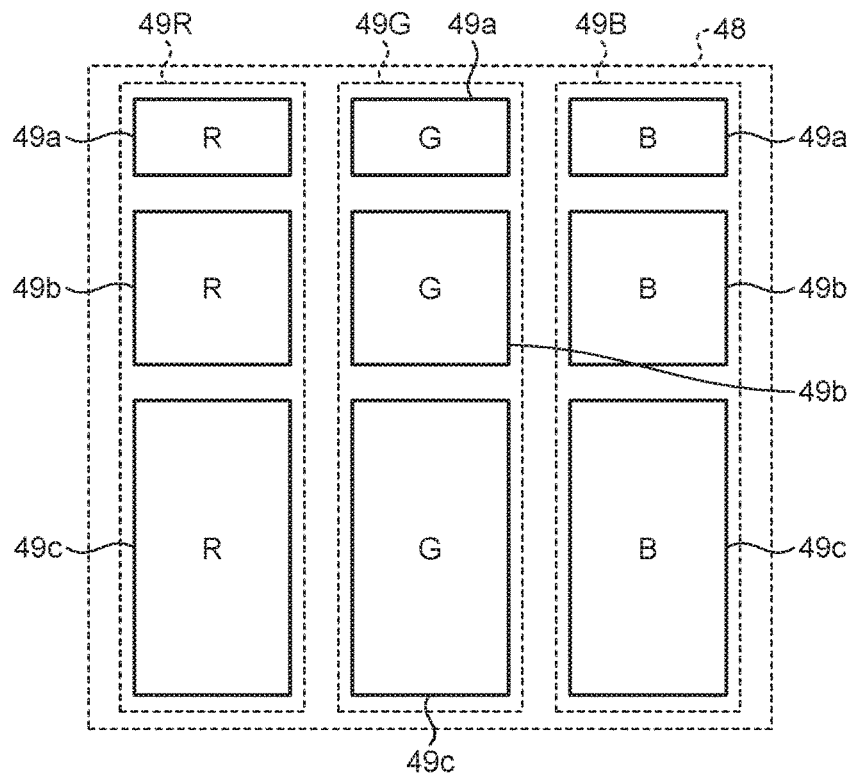
FIG. 3 is a diagram illustrating an exemplary relation among a unit pixel, sub pixels included in the unit pixel, and pixels included in each sub pixel in the first embodiment.

FIG. 3 is a diagram illustrating an exemplary relation among each unit pixel 48 in the first embodiment, a sub pixel included in the unit pixel 48, and the pixel 49 included in the sub pixel. The display unit 10 includes a plurality of the unit pixels 48 arranged in the row and column directions. As illustrated in FIG. 3, one unit pixel 48 includes a plurality of the sub pixels. Each sub pixel is provided with the color filter 46 of a different color. One unit pixel 48 in the first embodiment includes three sub pixels. A combination of colors of the color filters 46 provided to the three sub pixels are red (R), green (G), and blue (B). This number of sub pixels and this combination of colors are merely exemplary, and may be modified as appropriate. In FIG. 3, a sub pixel provided with the color filter 46 of red (R) is denoted by reference numeral 49R. A sub pixel provided with the color filter 46 of green (G) is denoted by reference numeral 49G. A sub pixel provided with the color filter 46 of blue (B) is denoted by reference numeral 49B.

One sub pixel includes a plurality of (for example, three) the pixels 49. The plurality of the pixels 49 provided in the sub pixel serve as individually controlled minimum units. Each sub pixel according to the first embodiment has a function to perform outputting in three-bit area coverage modulation through an ON/OFF pattern of a pixel 49a, a pixel 49b, and a pixel 49c, the three pixels having different sizes of display regions. Each display region is a region through which light is transmitted in accordance with a voltage applied to liquid crystals in the liquid crystal layer 43. The pixel 49a, the pixel 49b, and the pixel 49c are collectively referred to as the pixel 49 when the three pixels are not needed to be distinguished. For example, a display mechanism is the same between the pixel 49a, the pixel 49b, and the pixel 49c, and thus the pixel 49 is illustrated in FIG. 2. The pixel 49a, the pixel 49b, the pixel 49c each achieve a different display region through a different area of the pixel electrode 44 or different areas of the pixel electrode 44 and the counter electrode 45. The "pixel 49" refers to any one of a plurality of the pixels 49a, 49b, and 49c included in a sub pixel.

Figure 4:
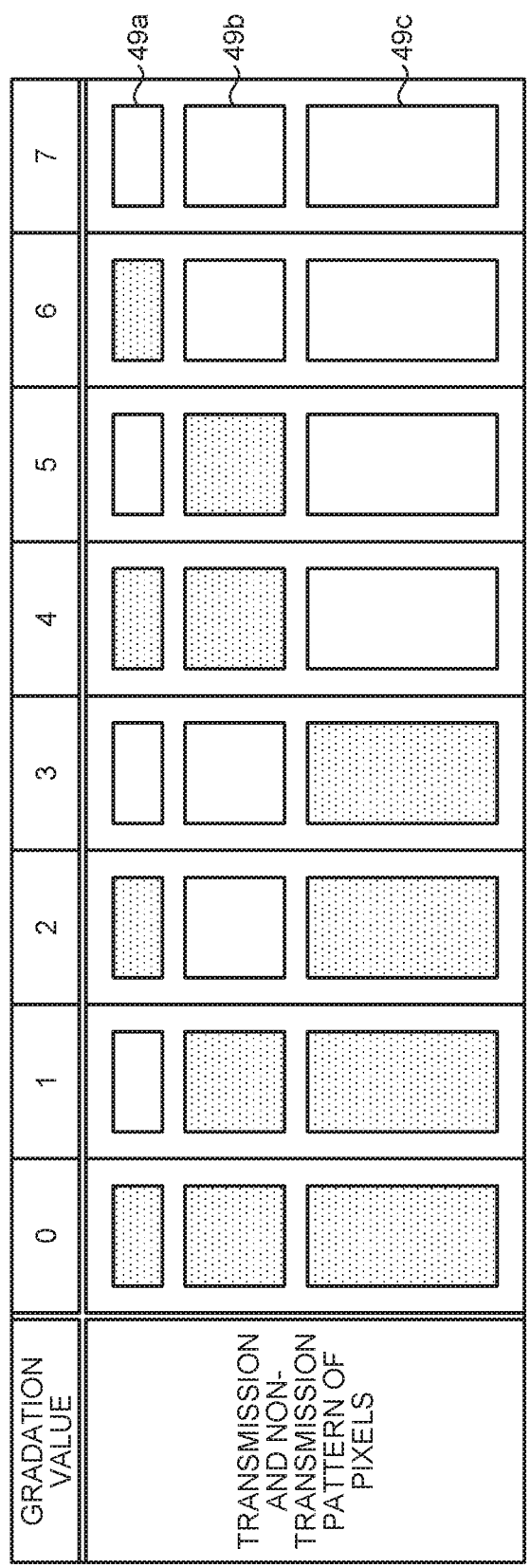
FIG. 4 is a diagram illustrating an exemplary ON/OFF pattern of three pixels included in a sub pixel.

FIG. 4 is a diagram illustrating an exemplary ON/OFF pattern of three pixels 49 included in a sub pixel. In FIG. 4, shading is provided to any pixel 49 in a non-transmissive state. As illustrated in FIG. 4, the sub pixel according to the first embodiment can perform outputting corresponding to three-bit (eight) gradation values through combinations of transmission (ON) and non-transmission (OFF) of each of the three pixels 49. The transmission (ON) refers to, for example, a state in which the pixel 49 is performing outputting at a highest gradation. The non-transmission (OFF) refers to, for example, a state in which the pixel 49 performs outputting at a lowest gradation. Outputting at the transmission is not limited to the highest gradation, but may be a gradation higher than that at the non-transmission.

The outputting corresponding to the three-bit gradation values described with reference to FIG. 4 is achieved by switching the transmission (ON) and non-transmission (OFF) of the pixel 49, but the pixel 49 according to the first embodiment can perform outputting at multiple gradations irrespective of the switching of the transmission (ON) and non-transmission (OFF). When each pixel 49 performs the multiple gradation outputting, one sub pixel in the first embodiment can perform the multiple gradation outputting in, for example, 18 bits. Accordingly, the gradation capability of the sub pixel depends on gradation capability of the pixel 49.

In the first embodiment, the three pixels 49 included in one sub pixel have different sizes of display regions, but this is merely exemplary and the present invention is not limited thereto. Part or all of a plurality of pixels 49 included in one sub pixel may have identical shapes and sizes of display regions.

The number of the pixels 49 included in each sub pixel is not limited to the example described with reference to FIG. 4 but is optional. The number of bits for the area coverage modulation depends on, for example, the number of the pixels 49 included in one sub pixel and the size of the display region of each of the pixels 49.

Figure 5:
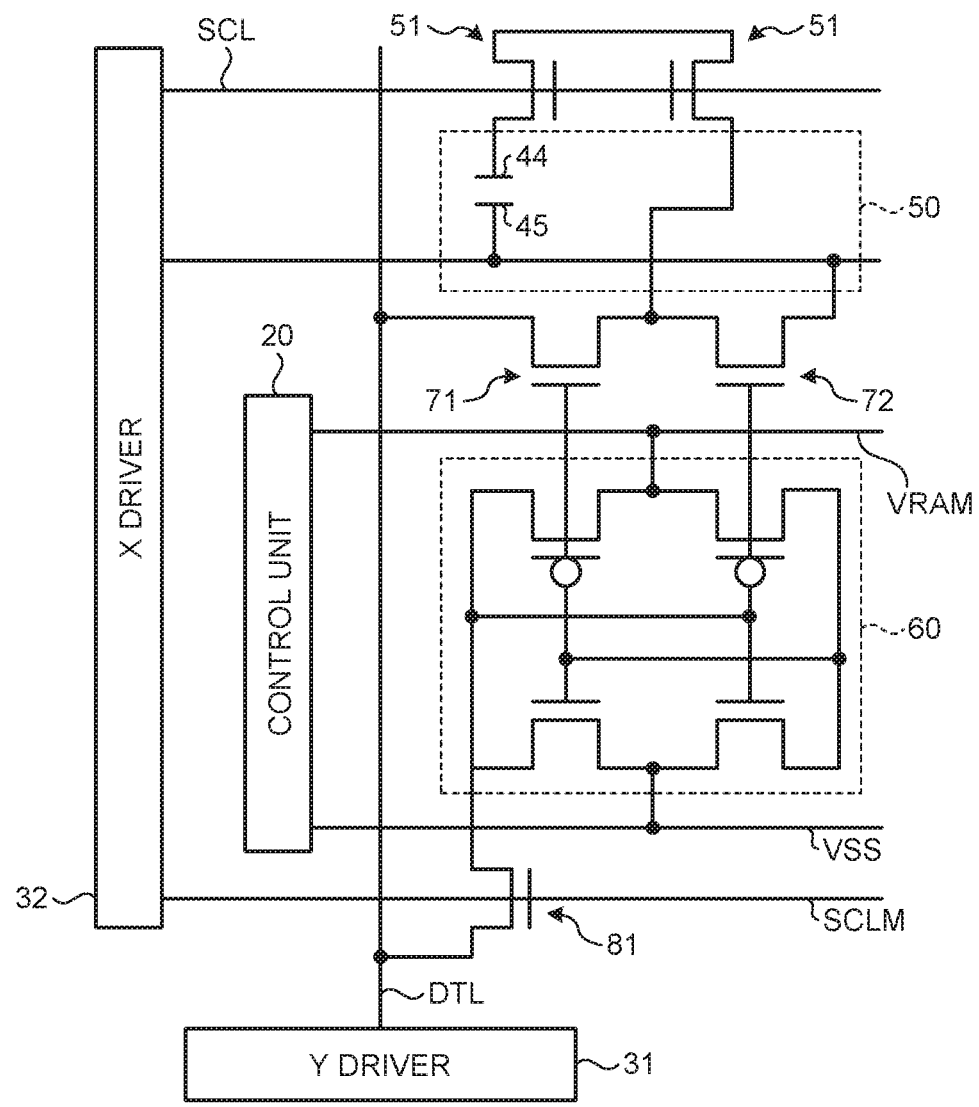
FIG. 5 is a diagram illustrating an exemplary schematic configuration of a pixel drive circuit and an MIP circuit.

FIG. 5 is a diagram illustrating an exemplary schematic configuration of a pixel drive circuit 50 and a memory-in-pixel (MIP) circuit 60. The schematic configuration of the pixel drive circuit 50 and the MIP circuit 60 is common between all pixels 49 irrespective of the sizes of the display regions of the pixels 49. As illustrated in FIGS. 2 and 5, one pixel 49 includes the pixel drive circuit 50 and the MIP circuit 60 provided between the pixel electrode 44 and the pixel substrate 41.

The pixel drive circuit 50 applies voltage to the liquid crystals of the liquid crystal layer 43 in the display region. Specifically, the pixel drive circuit 50 includes for example, a couple wire coupled with the pixel electrode 44, and a thin film transistor (TFT) 51 provided to this couple wire and configured to operate in response to a drive signal transmitted through a first scanning line SCL. The couple wire is coupled with one of the signal line DTL and the counter electrode 45 through selection wire. When the TFT 51 is turned on in response to a drive signal while the couple wire and the signal line DTL are coupled with each other through the selection wire, a signal such as the gradation signal transmitted through the signal line DTL is applied to the pixel electrode 44. Accordingly, voltage in accordance with the signal is applied between the pixel electrode 44 and the counter electrode 45. When the TFT 51 is turned on in response to a drive signal while the couple wire and the counter electrode 45 are coupled with each other through the selection wire, the pixel electrode 44 and the counter electrode 45 are electrically coupled with each other, and thus the pixel electrode 44 and the counter electrode 45 have identical potentials, and the voltage between the pixel electrode 44 and the counter electrode 45 becomes zero. In the first embodiment, when the voltage between the pixel electrode 44 and the counter electrode 45 becomes zero, the pixel 49 is turned off.

The TFT 51 illustrated in, for example, FIG. 5 is provided to be a double gate type, but is not limited thereto and may be a single gate type.

The selection wire includes a first bifurcating line coupling the couple wire and the signal line DTL, a second bifurcating line coupling the couple wire and the counter electrode 45, and TFTs 71 and 72 provided to each of the first bifurcating line and the second bifurcating line. The first bifurcating line couples the signal line DTL and the couple wire while the TFT 71 is turned on. The second bifurcating line couples the counter electrode 45 and the couple wire while the TFT 72 is turned on.

The MIP circuit 60 serves as a memory in the first embodiment. Specifically, the MIP circuit 60 includes a latch circuit holding a one-bit signal, a wire coupling this latch circuit and the signal line DTL, and a TFT 81 provided to this wire and configured to operate in response to a latch update signal transmitted through a second scanning line SCLM.

The latch circuit is coupled with a wire VSS being at a predetermined ground potential (GND potential) and a wire VRAM to which a signal at a VGH potential or a VDD potential output from an oscillator included in the control unit 20 is applied. The VGH potential is higher than the VDD potential and the GND potential. The VDD potential is higher than the GND potential. When the VGH potential is applied through the wire VRAM, the latch circuit continues holding the one-bit signal.

The latch circuit turns on one of the TFT 71 and the TFT 72 and turns off the other depending on a held value. The value held by the latch circuit in the first embodiment is represented by Low (0) or High (1). The TFT 71 is turned on when the value is Low, whereas the TFT 72 is turned on when the value is High. Hereinafter, the simple notation of "Low" or "High" indicates the value held by the latch circuit. In a case of Low, the couple wire is coupled with the signal line DTL. In a case of High, the couple wire is coupled with the counter electrode 45.

The control unit 20 is an integrated circuit (IC) as an integration of, for example, a power circuit, an oscillator, a timing controller, an image memory, an interface control circuit, and a panel control circuit. The power circuit supplies the VGH potential, the VDD potential, and the GND potential. The oscillator supplies alternating current used in, for example, inversion drive. The timing controller T-CON outputs a clock signal. The interface control circuit generates the gradation signal and the one-bit signal to be input to each pixel 49 of the display unit 10 based on an image signal input through a flexible printed board (FPC) from a control device included in an electronic apparatus with the liquid crystal display device 1. The panel control circuit outputs various kinds of control signals by which the display unit 10 is operated in any one of an analog mode (AM) and a memory mode (MM) depending on a mode specifying signal. The mode specifying signal determines an operation mode of the liquid crystal display device 1 and is output by an external control device to be described later. The simple notations of "AM" and "MM" indicate "the analog mode" and "the memory mode", respectively. AM is a mode in which the display unit 10 performs display output in accordance with the gradation signal generated based on image data. MM is a mode in which the display unit 10 performs display output in accordance with the one-bit signal held in the memory (MIP circuit 60).

The control unit 20 is coupled with an X driver 32 and a Y driver 31 included in the LCD driver 30. The control unit 20 controls operation states of the pixel drive circuit 50 and the MIP circuit 60 by outputting signals to the first scanning line SCL and the second scanning line SCLM through the X driver 32. The control unit 20 also controls the gradation of each pixel 49 by outputting the gradation signal or the one-bit signal to the signal line DTL through the Y driver 31. The X driver 32 is a circuit configured to output a drive signal to the first scanning line SCL and the latch update signal to the second scanning line SCLM under control of the control unit 20. The Y driver 31 is a circuit configured to output the gradation signal or the one-bit signal to the signal line DTL coupled with each pixel 49 under control of the control unit 20.

The control unit 20 according to the first embodiment includes a memory configured to store therein information on start-up setting (AM or MM). The start-up setting is set in accordance with the mode specifying signal.

The following describes the mode switching of the display unit 10. The display unit 10 operates in AM as a first mode or MM as a second mode. The control unit 20 performs first mode preparation processing (Write Mode A: WMA) in advance to operate the display unit 10 in AM. The control unit 20 performs second mode preparation processing (Write Mode M: WMM) in advance to operate the display unit 10 in the memory mode. The simple notations of "WMA" and "WMM" indicate "the first mode preparation processing" and "the second mode preparation processing", respectively.

Figure 6:
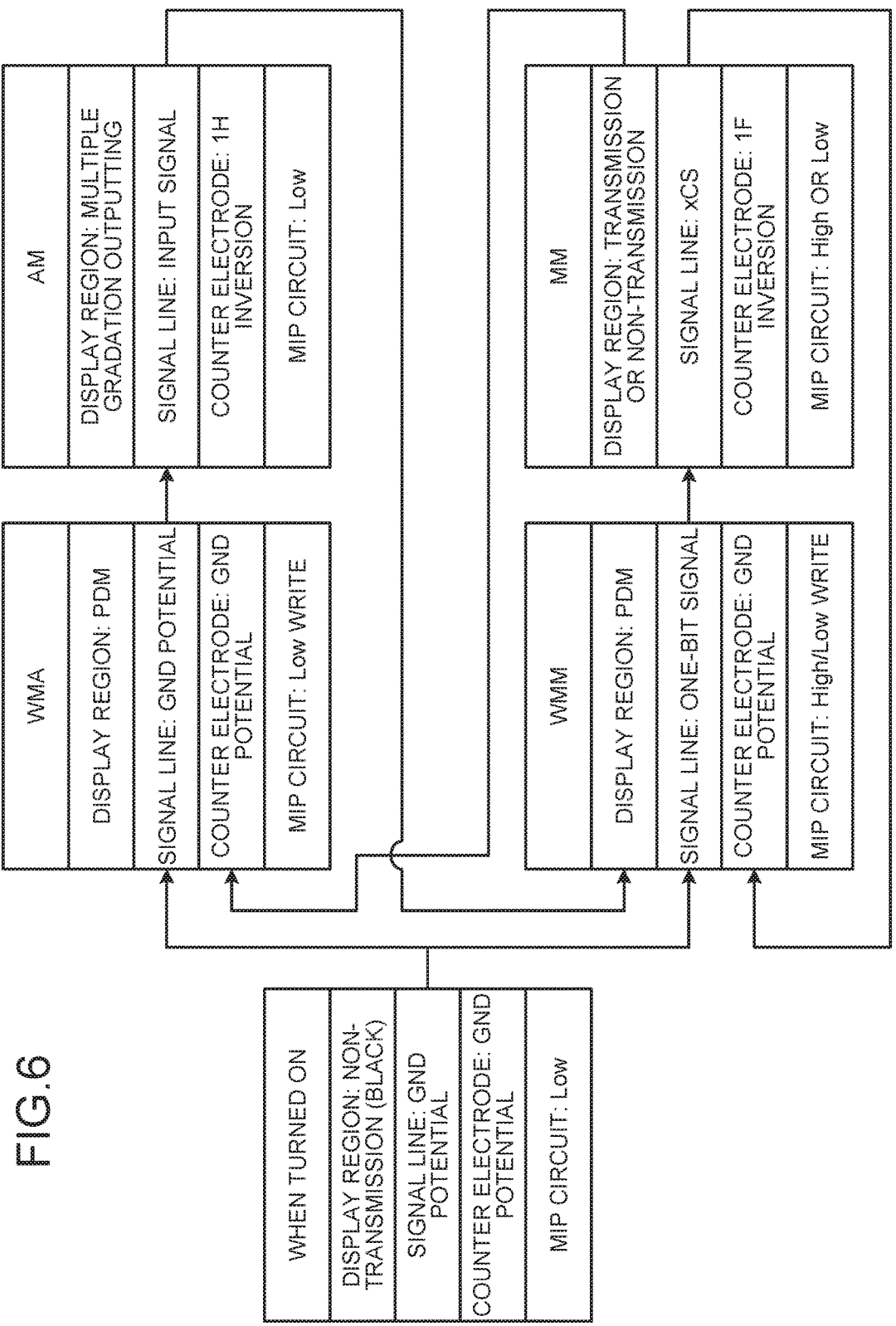

FIG. 6 is a diagram illustrating the process of a mode change of the liquid crystal display device 1. The liquid crystal display device 1 changes to WMM or WMA after being turned on. The liquid crystal display device 1 changes to AM through WMA after being turned on. The liquid crystal display device 1 also changes to MM through WMM after being turned on. When changing from AM to MM, the liquid crystal display device 1 changes to MM through WMM. When changing from MM to AM, the liquid crystal display device 1 changes to AM through WMA. To update display content in MM, the liquid crystal display device 1 changes from MM through WMM back to MM.

Figure 7:
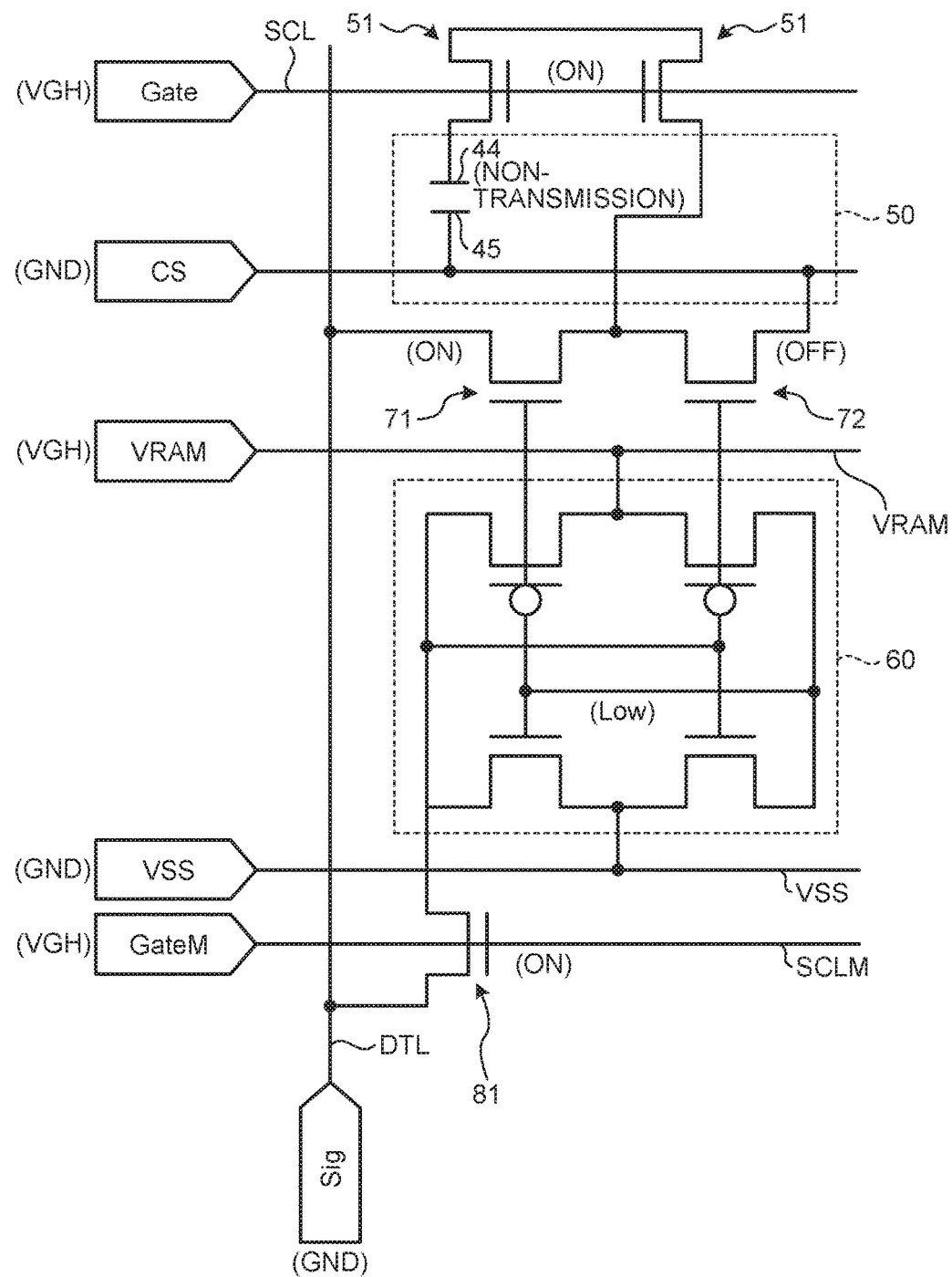
Figure 8:
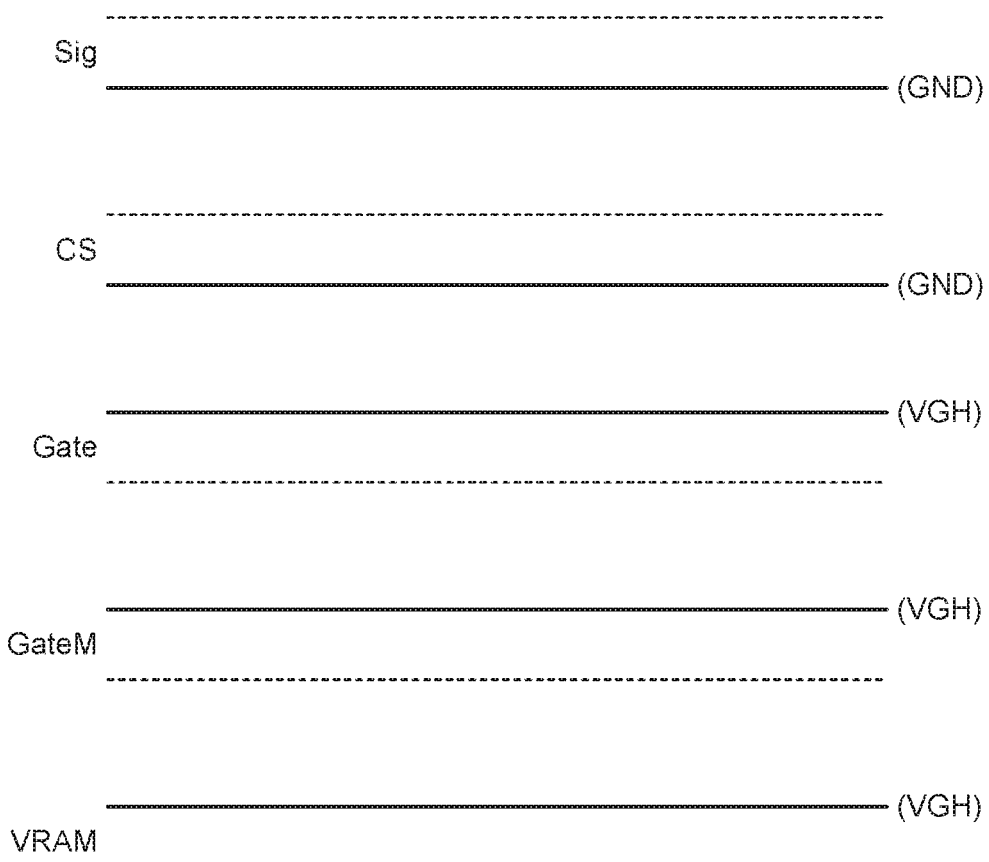

FIG. 7 is a diagram illustrating an operation state of each component of the pixel drive circuit 50 and the MIP circuit 60 before the liquid crystal display device 1 changes to WMA or WMM after being turned on. In FIG. 7, for example, an input side of the signal line DTL is denoted by "Sig", an input side of the first scanning line SCL is denoted by "Gate", an input side of the counter electrode 45 is denoted by "CS", an input side of the wire VRAM is denoted by "VRAM", an input side of the wire VSS is denoted by "VSS", and an input side of the second scanning line SCLM is denoted by "GateM". FIG. 8 is a timing chart schematically illustrating the potentials of the signal line DTL, the counter electrode 45, the first scanning line SCL, the second scanning line SCLM, and the wire VRAM before the liquid crystal display device 1 changes to WMA or WMM after being turned on. Before the liquid crystal display device 1 changes to WMA or WMM after being turned on, the potential of the wire VRAM is at the VGH potential. Simultaneously, the potential of the second scanning line SCLM is at the potential (VGH potential) of the latch update signal, and the TFT 81 is turned on. The MIP circuit 60 in this state is at Low. Accordingly, the TFT 71 is turned on, whereas the TFT 72 is turned off. Before the liquid crystal display device 1 changes to WMA or WMM after being turned on, the potential of the first scanning line SCL is at the VGH potential. Accordingly, the TFT 51 is turned on. The signal line DTL is supplied with no signal and thus is at the GND potential. The potential of the counter electrode 45 is at the GND potential. Accordingly, voltage applied to the liquid crystal layer 43 is zero, and thus the display region of the pixel 49 is turned off.

Figure 9:
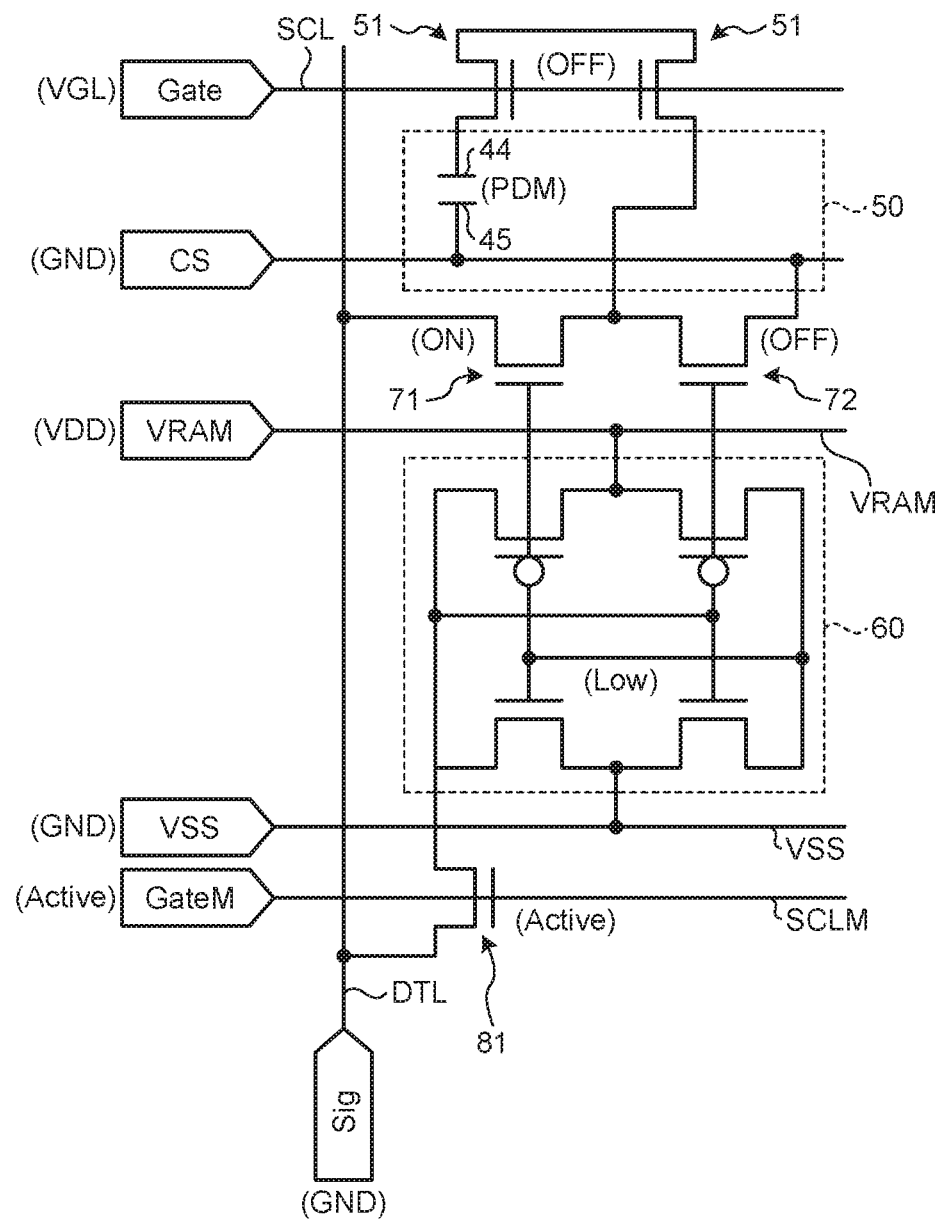
FIG. 9 is a diagram illustrating the operation state of each component of the pixel drive circuit and the MIP circuit in WMA.
Figure 10:
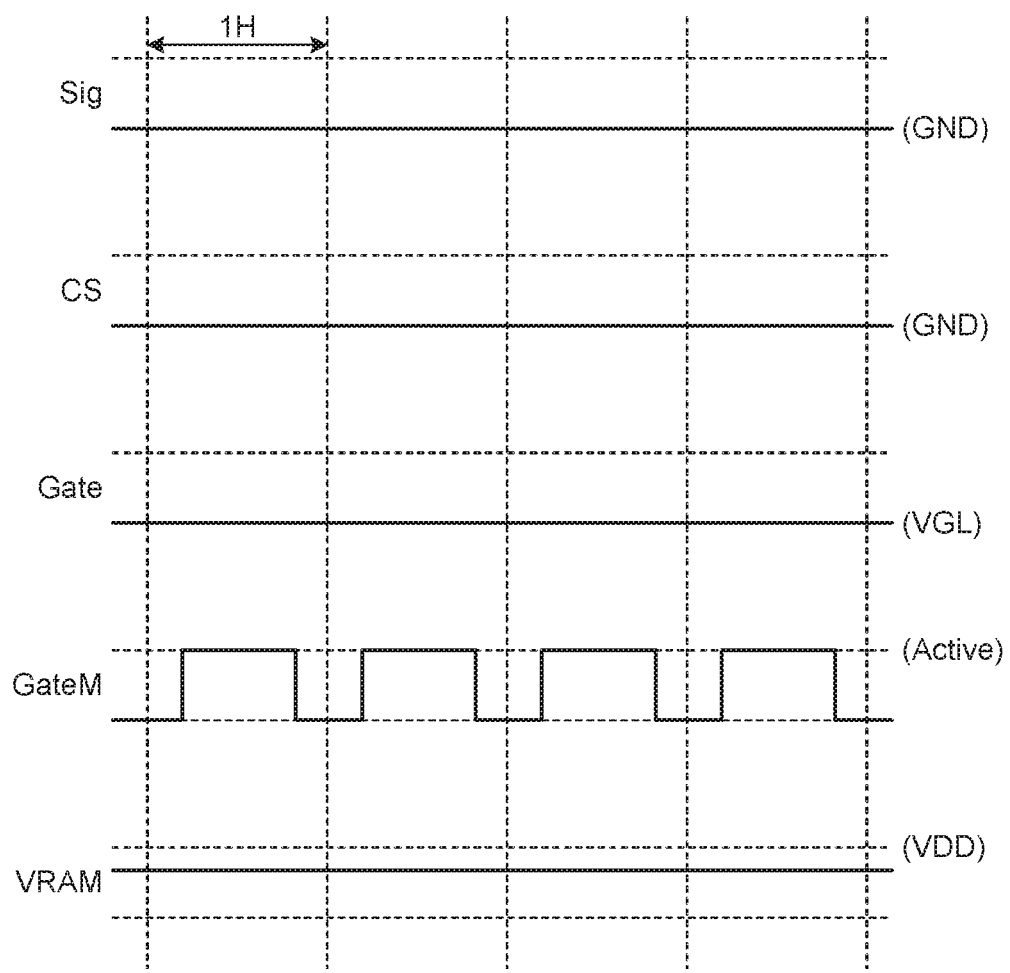
FIG. 10 is a timing chart schematically illustrating the potentials of the signal line, the counter electrode, the first scanning line, the second scanning line, and the wire in WMA.

FIG. 9 is a diagram illustrating the operation state of each component of the pixel drive circuit 50 and the MIP circuit 60 in WMA. FIG. 10 is a timing chart schematically illustrating the potentials of the signal line DTL, the counter electrode 45, the first scanning line SCL, the second scanning line SCLM, and the wire VRAM in WMA. In the case of WMA, the potential of the counter electrode 45 is at the GND potential. The potential of the first scanning line SCL is at a VGL potential. The VGL potential is lower than the VGH potential. In this case, the TET 51 is turned off. The display region in this state is in a display state (Previous Display Mode: PDM) at mode change. The display region in the display state (PDM) at mode change is in a non-transmission state (black). The simple notation of "1H" indicates "one horizontal scanning duration". One horizontal scanning duration is the duration of signal input to the pixels 49 in a predetermined number of pixel rows. The predetermined number is optional and can be set as appropriate, assuming the pixel rows of the pixels 49 included in the display unit 10 are driven in a divided manner.

In the case of WMA, the second scanning line SCLM is supplied with the latch update signal. The latch update signal is supplied to scan the entire display region of the display unit 10 in units of pixel rows in the vertical direction (pixel column direction). In other words, the latch update signal is supplied in each 1H to drive the TFT 81 coupled with the MIP circuit 60 of a pixel in a different pixel row. In FIG. 9, for example, "active" represents the state of a target of signal supply corresponding to such scanning in the vertical direction. In FIG. 9, the second scanning line SCLM and the TFT 81 are active. When the TFT 81 is active in WMA, the potential of the wire VRAM is at the VDD potential. When the potential of the wire VRAM is at the VDD potential, the MIP circuit 60 becomes a state (High or Low) in accordance with the potential of a signal input from the signal line DTL when the TFT 81 is turned on. In the case of WMA, the potential of the signal line DTL is at the GND potential and lower than the potential (VDD) of the wire VRAM. Accordingly, the MIP circuit 60 becomes Low irrespective of its previous state. In other words, at the timing of WMA, the MIP circuits 60 of all pixels become Low.

Figure 11:
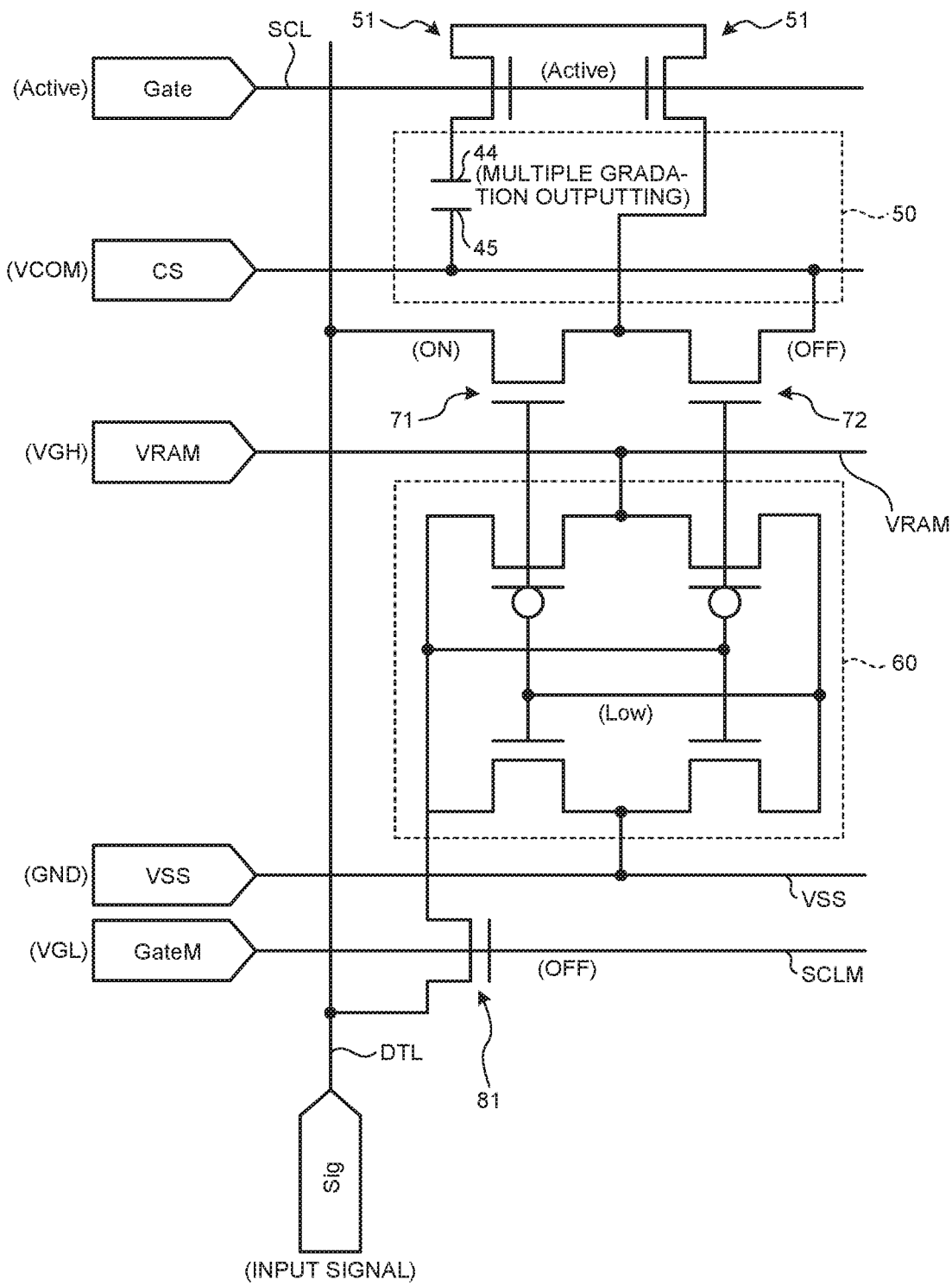
FIG. 11 is a diagram illustrating the operation state of each component of the pixel drive circuit and the MIP circuit in AM.
Figure 12:
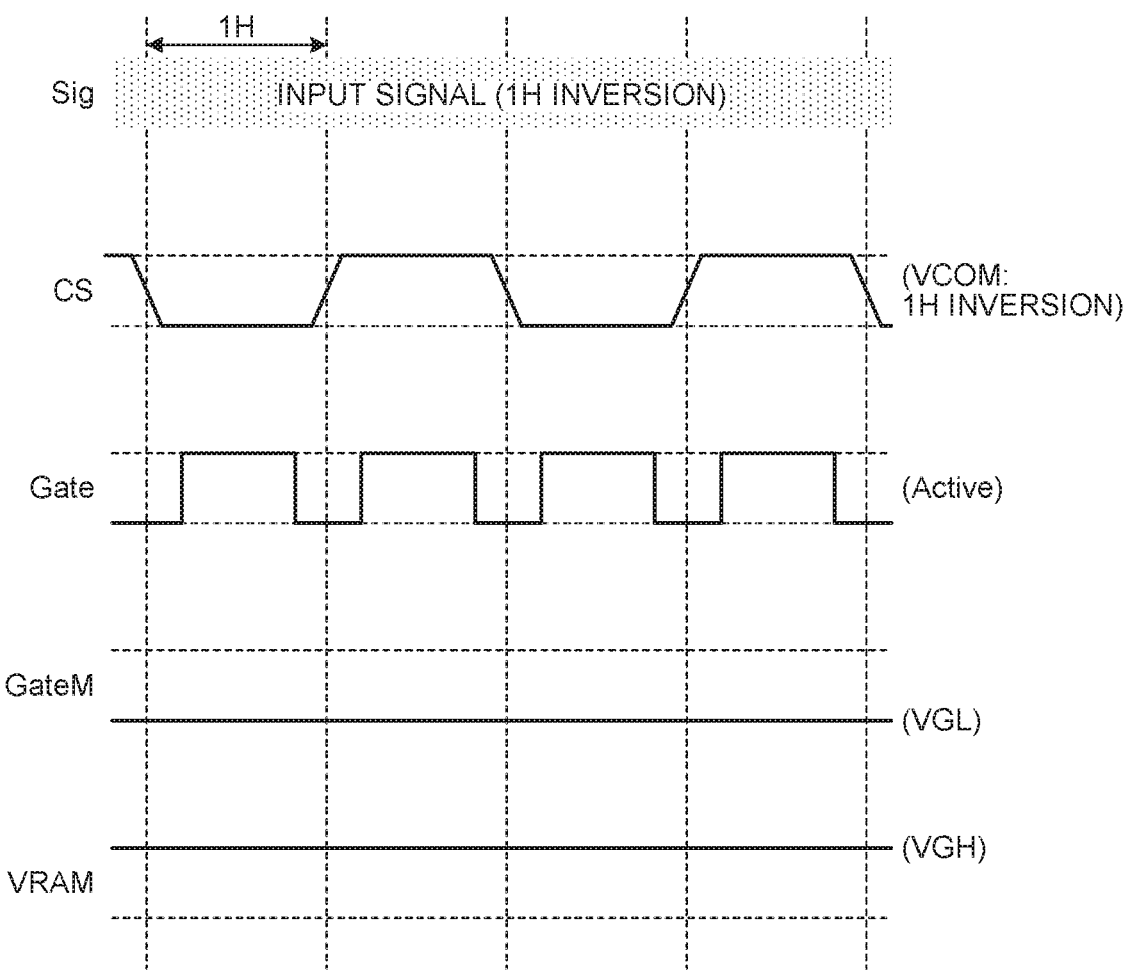
FIG. 12 is a timing chart schematically illustrating the potentials of the signal line, the counter electrode, the first scanning line, the second scanning line, and the wire in AM.

FIG. 11 is a diagram illustrating the operation state of each component of the pixel drive circuit 50 and the MIP circuit 60 in AM. FIG. 12 is a timing chart schematically illustrating the potentials of the signal line DTL, the counter electrode 45, the first scanning line SCL, the second scanning line SCLM, and the wire VRAM in AM. In the case of AM, the first scanning line SCL is supplied with a drive signal to scan the entire display region of the display unit 10 in units of pixel rows in the vertical direction (pixel column direction). The signal line DTL is supplied with the gradation signal in accordance with the gradation value of each pixel 49. In other words, in the case of AM, the display region of the pixel 49 performs the multiple gradation outputting in accordance with a gradation value indicated by the gradation signal. Accordingly, in the case of AM, the pixel 49 is driven to perform display output in accordance with the gradation signal generated based on image data. In the case of AM, the potential of the wire VRAM is at the VGH potential. Simultaneously, the potential of the second scanning line SCLM is at the VGL potential, and the TFT 81 is turned off. At such potentials of the wire VRAM and the second scanning line SCLM, the setting of the MIP circuit 60 is maintained. The MIP circuit 60 is set to Low at the timing of WMA, and thus the MIP circuit 60 is maintained at Low during an operation in AM.

In the case of AM, as illustrated in FIG. 12, the inversion drive is performed in, for example, each 1H. Specifically, the sign of potential is inverted in accordance with the potential of the gradation signal supplied to the pixel drive circuit 50 through the signal line DTL and a drive voltage (VCOM) of the counter electrode 45.

Figure 13:
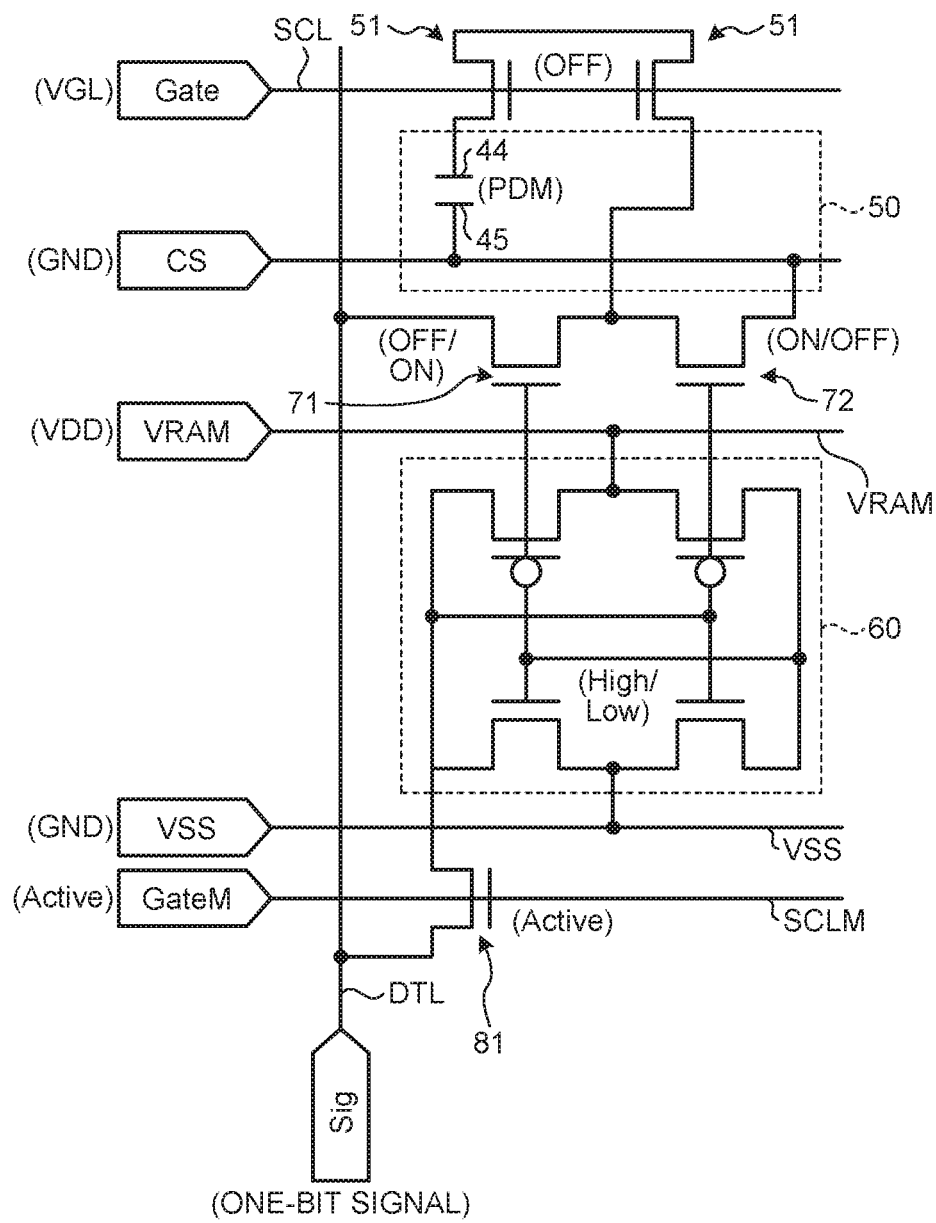
FIG. 13 is a diagram illustrating the operation state of each component of the pixel drive circuit and the MIP circuit in WMM.
Figure 14:
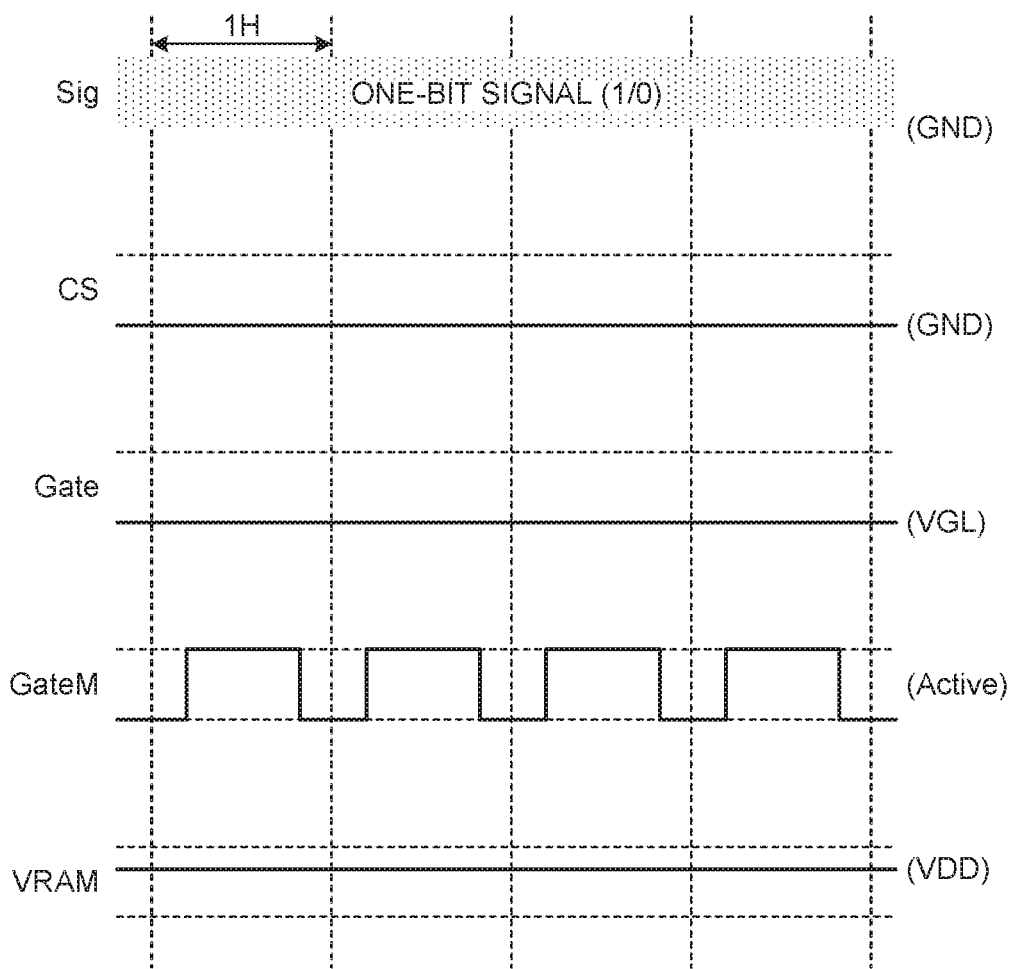
FIG. 14 is a timing chart schematically illustrating the potentials of the signal line, the counter electrode, the first scanning line, the second scanning line, and the wire in WMM.

FIG. 13 is a diagram illustrating the operation state of each component of the pixel drive circuit 50 and the MIP circuit 60 in WMM. FIG. 14 is a timing chart schematically illustrating the potentials of the signal line DTL, the counter electrode 45, the first scanning line SCL, the second scanning line SCLM, and the wire VRAM in WMM. In the case of WMM, similarly to the case of WMA, the display region becomes the display state (PDM) at mode change. In the case of WMM, similarly to the case of WMA, the second scanning line SCLM and the TFT 81 become active, and the potential of the wire VRAM becomes equal to the VDD potential. In the case of WMM, however, unlike the case of WMA, a one-bit signal is input from the signal line DTL. This one-bit signal (digital signal) has two potentials. One (the VGH potential) of the two potentials of the signal is higher than the VDD potential, whereas the other (the GND potential) is lower than the VDD potential. In the case of the potential higher than the VDD potential, the MIP circuit 60 becomes High. In the case of the potential lower than the VDD potential, the MIP circuit 60 becomes Low. In other words, the MIP circuit 60 is set to High or Low at the timing of WMM. Whether the MIP circuit 60 of each pixel is set to High or Low at the timing of WMM depends on a value that the digital signal transmitted through the signal line DTL indicates.

In this manner, the memory (MIP circuit 60) is coupled with wire (the wire VRAM) at a predetermined middle potential (the voltage of the VDD potential). The one-bit signal is input to the memory as a signal indicating two values by high and low potentials with respect to this middle potential.

Figure 15:
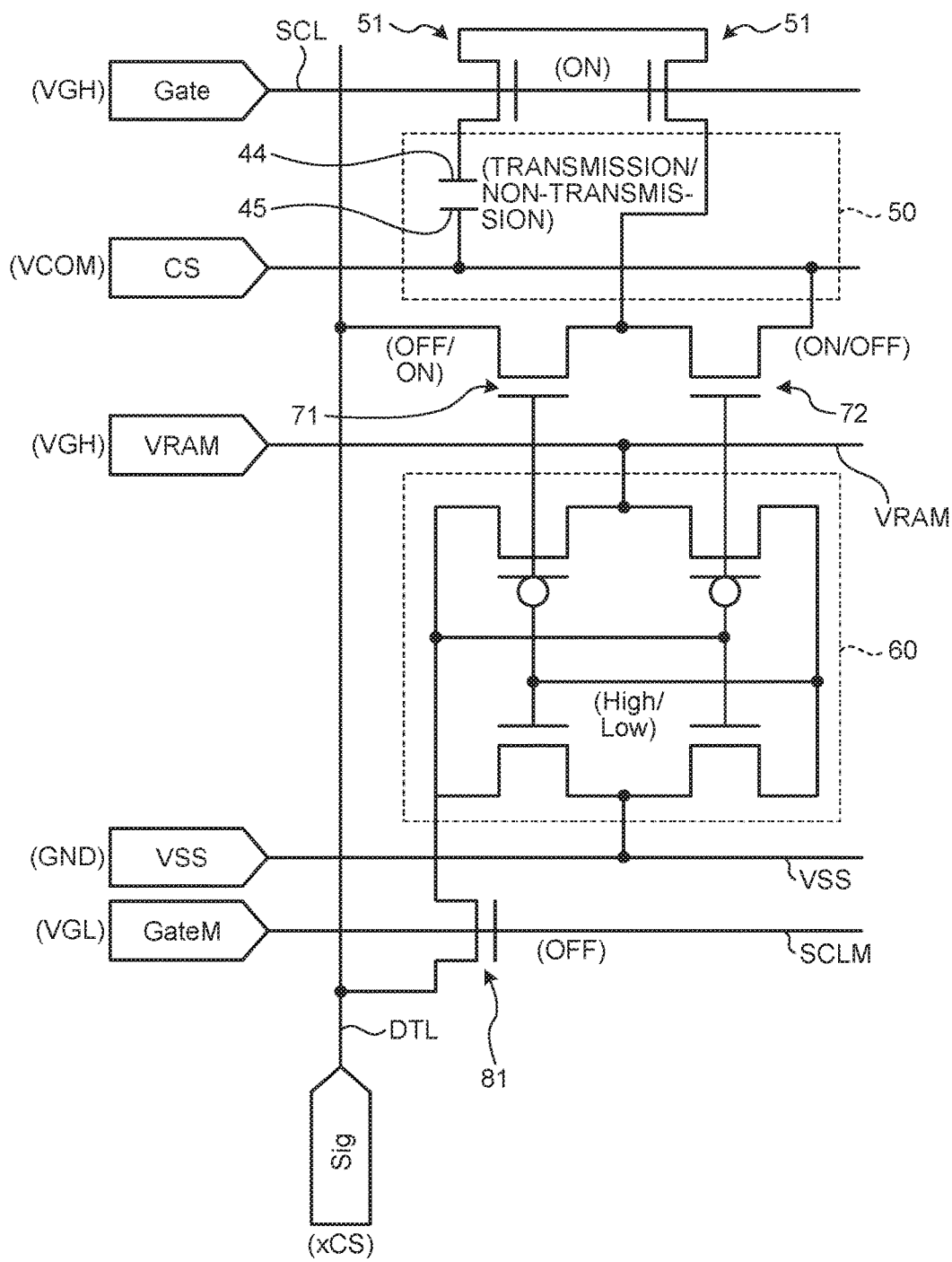
FIG. 15 is a diagram illustrating the operation state of each component of the pixel drive circuit and the MIP circuit in MM.
Figure 16:
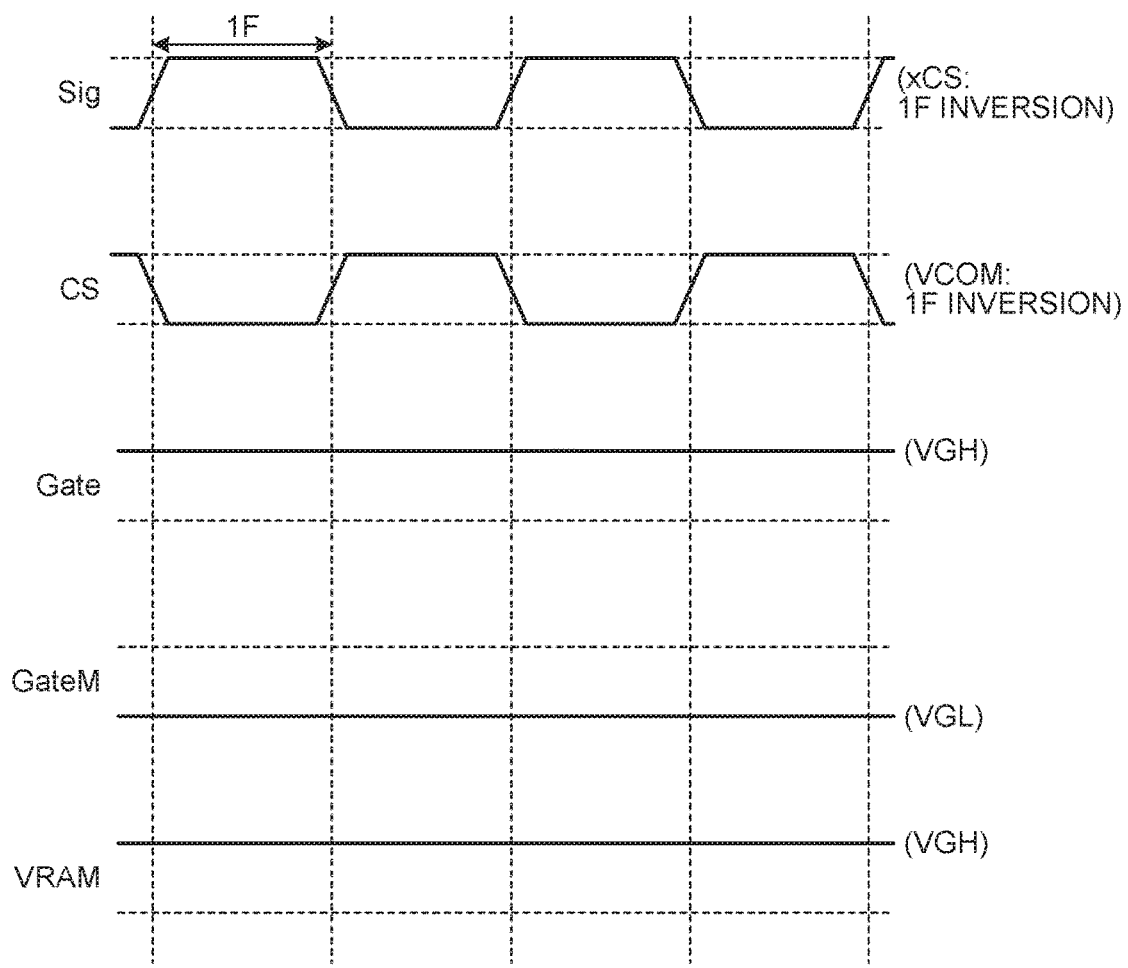
FIG. 16 is a timing chart schematically illustrating the potentials of the signal line, the counter electrode, the first scanning line, the second scanning line, and the wire in MM.

FIG. 15 is a diagram illustrating the operation state of each component of the pixel drive circuit 50 and the MIP circuit 60 in MM. FIG. 16 is a timing chart schematically illustrating the potentials of the signal line DTL, the counter electrode 45, the first scanning line SCL, the second scanning line SCLM, and the wire VRAM in MM. In the case of MM, the potential of the wire VRAM is at the VGH potential, and the potential of the second scanning line SCLM is at the VGL potential. In other words, the setting of the MIP circuit 60 is maintained. In the case of MM, the potential of the first scanning line SCL is at the VGH potential. Accordingly, the TFT 51 is turned on. The potential of the signal line DTL is a potential in accordance with a dedicated signal (xCS) supplied to the signal line DTL in MM. This dedicated signal is, for example, the signal in which the sign of the drive voltage (VCOM) supplied to the counter electrode 45 in the case of MM is inverted. In the case of MM, the inversion drive is performed. Specifically, the sign of the signal is inverted in, for example, each one frame (60 Hz).

In the case of MM, turning ON and OFF of the TFTs 71 and 72 depends on the setting of the MIP circuit 60 performed at the timing of WMM. When the MIP circuit 60 is Low, the TFT 71 is turned on and the TFT 72 is turned off. In other words, when the MIP circuit 60 is Low, the couple wire is coupled with the signal line DTL, so that the potential of the pixel electrode 44 is a potential in accordance with a signal through the signal line DTL. The potential of the counter electrode 45 in the case of MM is a potential with a sign opposite to the sign of the potential of the pixel electrode 44. Thus, when the MIP circuit 60 is Low, voltage is applied to the liquid crystal layer 43. In the first embodiment, when the MIP circuit 60 is Low in the case of MM, the potentials of the dedicated signal (xCS) and the drive voltage (VCOM) are set so as to turn on the display region of the pixel 49. In contrast, when the MIP circuit 60 is High, the TFT 72 is turned on, and the TFT 71 is turned off. In other words, when the MIP circuit 60 is High, the couple wire is coupled with the counter electrode 45. In this case, the pixel electrode 44 and the counter electrode 45 have identical potentials. Thus, when the MIP circuit 60 is High, the voltage applied to the liquid crystals is zero, and thus the display region of the pixel 49 is turned off. In this manner, in the case of MM, the pixel 49 is driven to perform display output in accordance with the one-bit signal (High or Low) stored in the memory (MIP circuit 60).

As described above, the signal line DTL included in the display unit 10 transmits the one-bit signal to be set to the gradation signal and the memory. The first scanning line SCL included in the display unit 10 turns on and off the TFT 51 by transmitting a first scanning signal (drive signal) indicating whether to couple the pixel drive circuit 50 and the signal line DTL. The second scanning line SCLM included in the display unit 10 transmits a second scanning signal (the latch update signal) indicating whether to couple the memory (MIP circuit 60) and the signal line DTL.

The pixel drive circuit 50 controls the display state (gradation) of the display region by applying, to the liquid crystals, voltage due to a potential difference with respect to a reference electrode (the counter electrode 45) of a reference potential (VCOM) having a periodically inverting sign. The memory (MIP circuit 60) includes a first switch (TFT 71) for switching coupling and non-coupling between the pixel drive circuit 50 and the signal line DTL, and a second switch (the TFT 72) for switching coupling and non-coupling between the pixel drive circuit 50 and the reference electrode. The control unit 20 outputs the gradation signal to the signal line DTL when the pixel 49 operates in the first mode (AM), and outputs, to the signal line DTL, the memory setting signal (xCS) of a potential different from the reference potential (VCOM) when the pixel 49 operates in the second mode (MM). Accordingly, when the pixel 49 operates in the first mode or when voltage is applied to the liquid crystals in the display region of the pixel 49 operating in the second mode, the control unit 20 couples the pixel drive circuit 50 and the signal line DTL and does not couple the pixel drive circuit 50 and the reference electrode. When voltage is not effectively applied to the liquid crystals in the display region of the pixel 49 operating in the second mode, the control unit 20 does not couple the pixel drive circuit 50 and the signal line DTL and couples the pixel drive circuit 50 and the reference electrode. The description of "voltage is not effectively applied" refers to a situation in which no voltage is applied because no potential difference is generated between the pixel electrode 44 and the reference electrode when the potential of the pixel electrode 44 is equal to the potential of the reference electrode (counter electrode 45).

The control unit 20 performs signal output for operating each pixel 49 of the display unit 10 in each mode described with reference to FIGS. 7 to 16, and processing for the signal output. Specifically, in the cases of WMA and WMM, the control unit 20 performs processing for setting the second scanning line SCLM and the TFT 81 to be active and setting the potential of the wire VRAM to be the VDD potential. In the case of WMA, the control unit 20 performs processing for setting the signal line DTL to be the GND potential without outputting a signal thereto. In the case of WMM, the control unit 20 performs processing for outputting, to the signal line DTL, the one-bit signal in accordance with the turning on and off of each pixel 49. In the cases of AM and MM, the control unit 20 performs processing for maintaining the one-bit signal (High or Low) set to the MIP circuit 60 by setting the potential of the wire VRAM to be the VGH potential and setting the potential of the second scanning line SCLM to be the VGL potential. In the case of AM, the control unit 20 generates the gradation signal for each pixel 49 based on an image signal and outputs the gradation signal to the pixel 49 through the signal line DTL coupled the pixel 49. In the case of MM, the control unit 20 generates the one-bit signal to be set to the MIP circuit 60 of each pixel 49 of the display unit 10 based on an image signal, and outputs the one-bit signal to the pixel 49 through the signal line DTL coupled with the pixel 49.

Through the above-described processing, the control unit 20 outputs the first scanning signal (drive signal) and the second scanning signal (the latch update signal) not to couple the pixel drive circuit 50 and the signal line DTL in a first duration (WMA duration) and a third duration (WMM duration) but to couple the memory (MIP circuit 60) and the signal line DTL, and thus sets the memory to be a non-operational state (Low) in the first duration, and writes the one-bit signal to the memory in the third duration.

Part of the processing in accordance with each mode by the control unit 20 is performed through signal output to the X driver 32 and the Y driver 31 which are circuits provided to the display unit 10. Specifically, for example, as illustrated in FIG. 5, the first scanning line SCL, the counter electrode 45, and the second scanning line SCLM are coupled with the X driver 32. The control unit 20 performs, using the X driver 32, signal output through the first scanning line SCL, the counter electrode 45, and the second scanning line SCLM in each mode. The signal line DTL is coupled with the Y driver 31. The control unit 20 performs, using the Y driver 31, signal output through the signal line DTL in each mode.

In the first embodiment, the wire VRAM and the wire VSS are directly coupled with the control unit 20, but the MIP circuit 60 may be controlled through a dedicated circuit for signal output to the MIP circuit 60 provided independently from the control unit 20.

Switching between the modes is performed by the control device coupled through the FPC. The control device outputs the mode specifying signal for specifying the mode of the liquid crystal display device 1. The control unit 20 operates the display unit 10 in any one of AM and MM in accordance with the mode indicated by this mode specifying signal. The control unit 20 performs processing related to WMA in advance when the mode changes to AM, and performs processing related to WMM in advance when the mode changes to MM. When the control device outputs the mode specifying signal which indicates update of display content during operation in MM, the control unit 20 updates the display content in MM through WMM.

Figure 17:
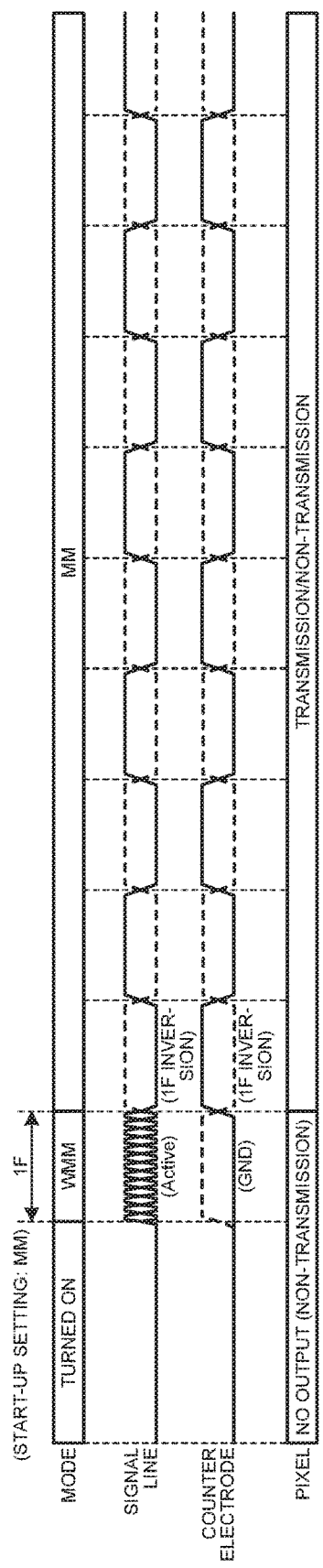
FIG. 17 is a timing chart illustrating a relation among a mode of the liquid crystal display device, a signal output to the signal line, a signal output to the counter electrode, and whether to perform display output by the display unit in the first embodiment.
Figure 18:
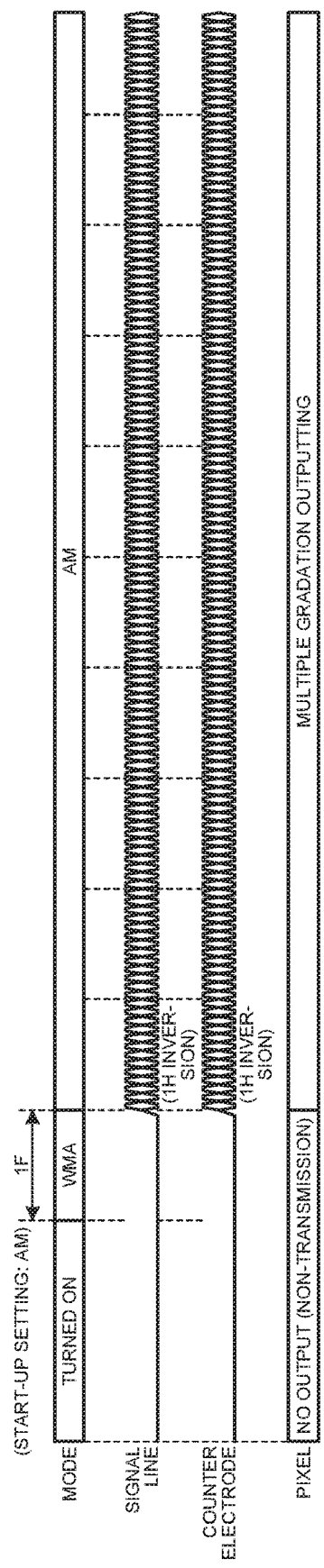
FIG. 18 is a timing chart illustrating the relation among the mode of the liquid crystal display device, the signal output to the signal line, the signal output to the counter electrode, and whether to perform display output by the display unit in the first embodiment.
Figure 19:
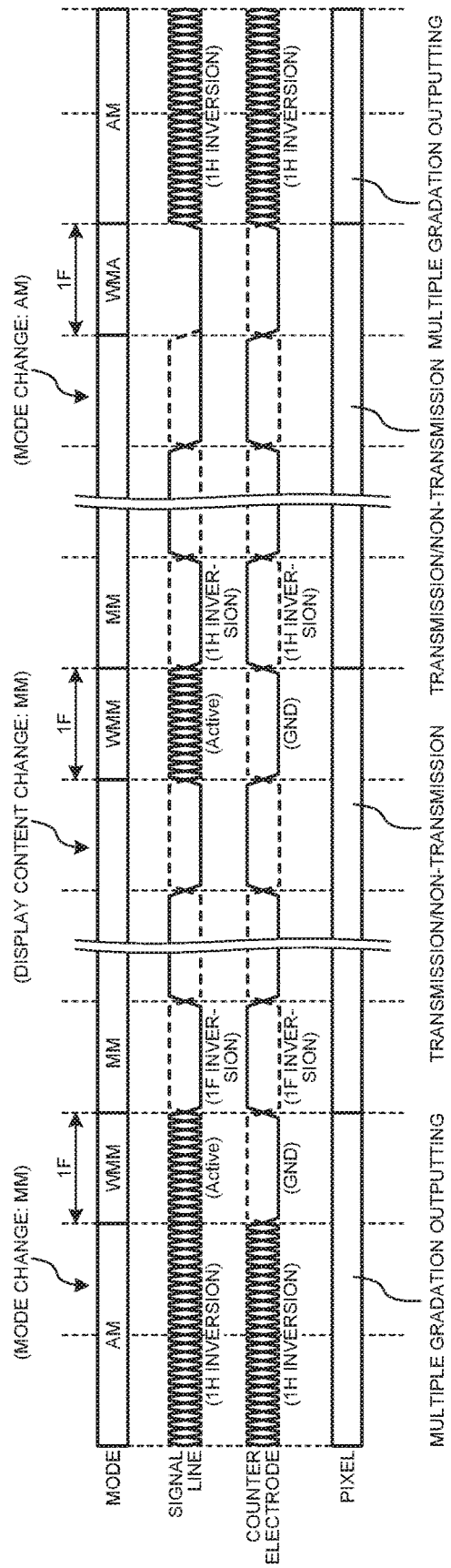
FIG. 19 is a timing chart illustrating the relation among the mode of the liquid crystal display device, the signal output to the signal line, the signal output to the counter electrode, and whether to perform display output by the display unit in the first embodiment.

FIGS. 17, 18, and 19 are each a timing chart illustrating a relation among the mode of the liquid crystal display device 1, a signal output to the signal line DTL, a signal output to the counter electrode 45, and whether to perform display output by the display unit 10 in the first embodiment.

For example, as illustrated in FIG. 17, when MM is the setting (start-up setting) of the mode at start-up of the liquid crystal display device 1, the control unit 20 performs the processing related to WMM in the first 1F after the liquid crystal display device 1 is turned on. During the 1F in which the processing related to WMM is performed, the signal line DTL is active as described above. The potential of the counter electrode 45 is equal to a potential (the GND potential) of the display state (PDM) at mode change. During a time until the liquid crystal display device 1 is turned on or during WMM, the pixel 49 is in the non-transmissive state.

After the 1F in which the processing related to WMM is performed, the control unit 20 performs processing related to display in MM. Accordingly, the potential of the signal line DTL and the potential of the counter electrode 45 are inverted in each 1F with their signs being opposite to each other.

As illustrated in FIG. 18, when the start-up setting is AM, the control unit 20 performs the processing related to WMA in the first 1F after the liquid crystal display device 1 is turned on. During the 1F in which the processing related to WMA is performed, the potential of the signal line DTL and the potential of the counter electrode 45 are equal to a potential (the GND potential) of the display state at mode change.

After the 1F in which the processing related to WMA is performed, the control unit 20 performs processing related to display in AM. Accordingly, the potential of the signal line DTL and the potential of the counter electrode 45 are inverted in each 1H with their signs being opposite to each other.

As illustrated in FIG. 19, when the mode changes from AM to MM, the control unit 20 performs the processing related to WMM in 1F durations before and after the change. When display content is modified in MM while the mode is maintained, the control unit 20 performs the processing related to WMM in 1F durations the modification of the display content before and after. When the mode changes from MM to AM, the control unit 20 performs the processing related to WMA in 1F durations before and after the change.

In this manner, the control unit 20 performs switching between the first mode (AM) causing the display unit 10 to perform display output in accordance with the gradation signal which is generated based on image data, and the second mode (MM) causing the display unit 10 to perform display output in accordance with the one-bit signal which is stored in the memory (MIP circuit 60). In the liquid crystal display device 1, signals are input to the pixel 49 in the first duration (WMA duration) in which a signal for setting the memory to be the non-operational state (Low) is output when the pixel 49 operates in the first mode (AM), a second duration (AM duration) in which the gradation signal is output to the pixel drive circuit 50 when the pixel 49 operates in the first mode, and the third duration (WMM duration) in which the one-bit signal is output to the memory when the pixel 49 operates in the second mode.

Although the period of sign inversion of a signal through the inversion drive in AM and MM is optional, the period of the inversion drive in the case of MM is longer than the period of the inversion drive in the case of AM. A longer period of the inversion drive leads to reduced electric power consumption in display output. In the case of MM, display output can be performed without outputting the gradation signal to each pixel 49 in each frame, and thus electric power consumption can be reduced as compared to the case of AM.

Figure 20:
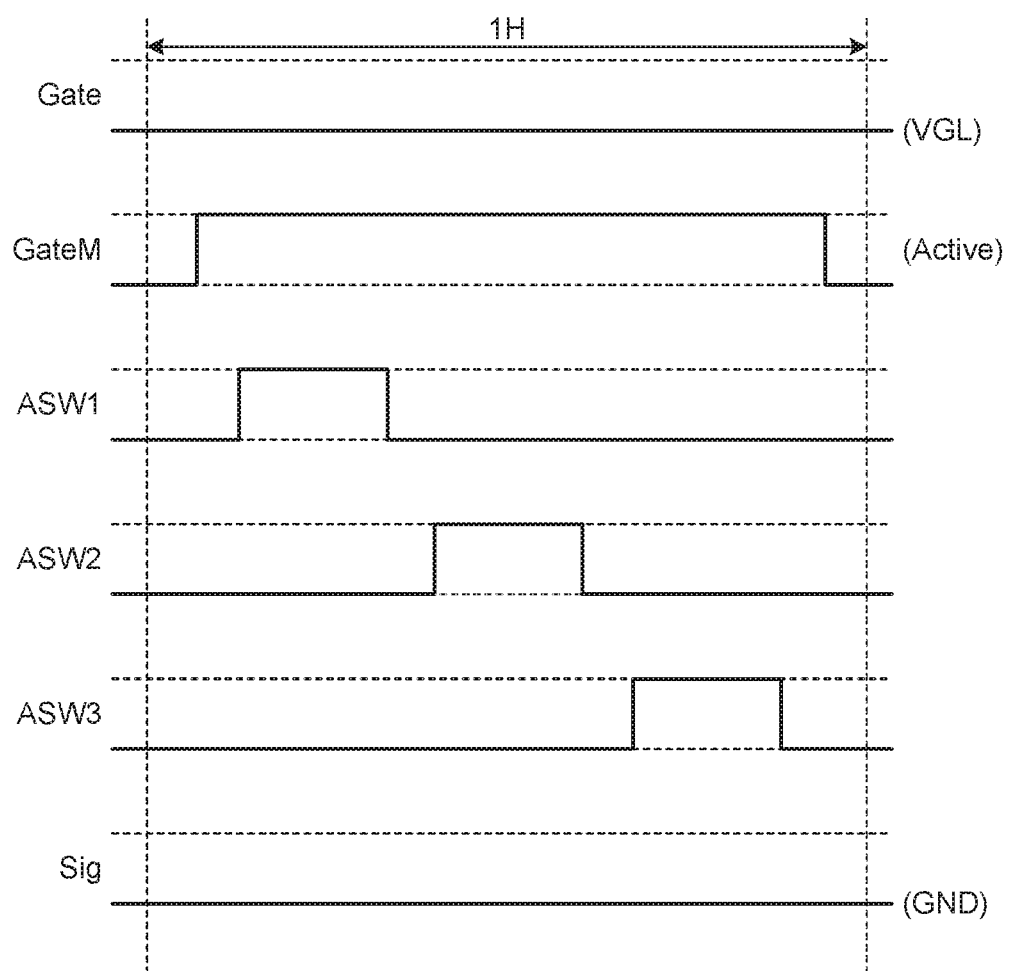
FIG. 20 is a timing chart illustrating an exemplary potential change in response to signal output related to one unit pixel in 1H duration in WMA.
Figure 21:
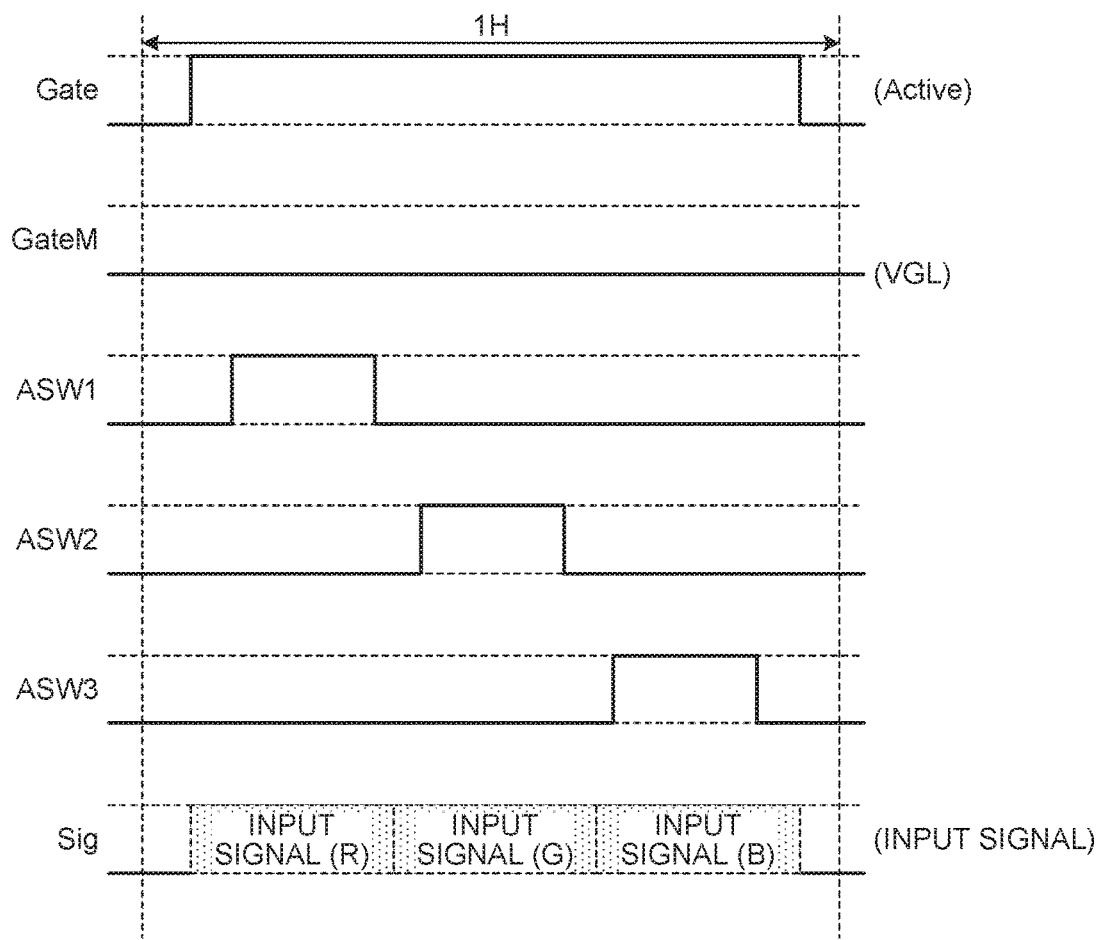
FIG. 21 is a timing chart illustrating an exemplary potential change in response to signal output related to one unit pixel in 1H duration in AM.
Figure 22:
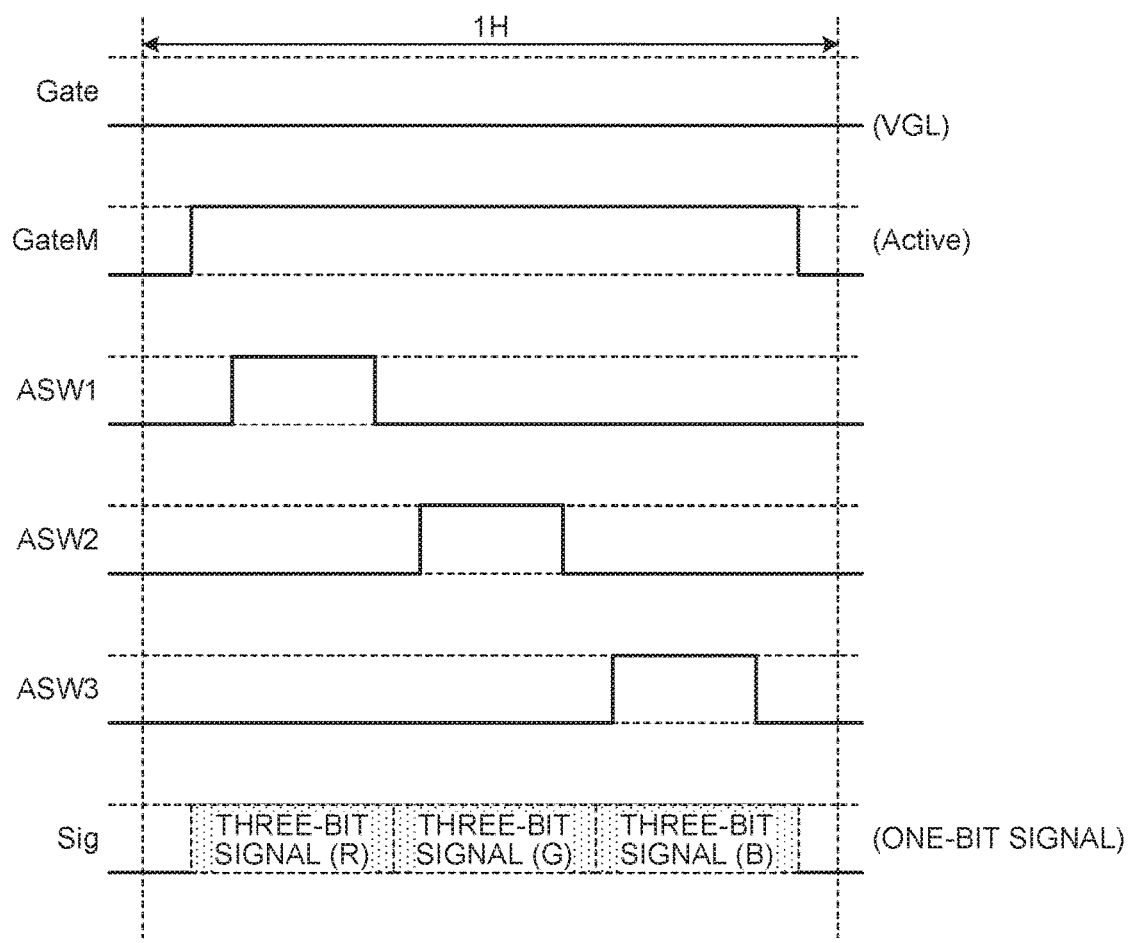
FIG. 22 is a timing chart illustrating an exemplary potential change in response to signal output related to one unit pixel 1H duration in WMM.

FIG. 20 is a timing chart illustrating an exemplary potential change in response to signal output related to one unit pixel in 1H duration in WMA. FIG. 21 is a timing chart illustrating an exemplary potential change in response to signal output related to one unit pixel in 1H duration in AM. FIG. 22 is a timing chart illustrating an exemplary potential change in response to signal output related to one unit pixel in 1H duration in WMM. In 1H duration of WMA, AM, and WMM, signals for driving switches are output to sequentially turn on and off switches (ASW1, ASW2, and ASW3) for transmitting a signal from the signal line DTL to any one of three sub pixels included in one unit pixel.

In WMA, the control unit 20 performs signal output in processing for setting the MIP circuit 60 to be Low. Accordingly, the potential of the first scanning line SCL (Gate) becomes equal to the VGL potential, the second scanning line SCLM (GateM) becomes active, and the potential of the signal line DTL becomes equal to the GND potential.

In AM, the control unit 20 performs signal output in processing for performing the multiple gradation outputting through the gradation signal. Accordingly, the first scanning line SCL (Gate) becomes active, and the potential of the signal line DTL becomes equal to a potential in accordance with a signal indicating the gradation value of each of the three sub pixels (RGB). In AM, the MIP circuit 60 is maintained to be Low, and thus the potential of the second scanning line SCLM (GateM) becomes equal to the VGL potential.

In WMM, the control unit 20 performs signal output in processing for setting the MIP circuit 60 to be High or Low. Accordingly, the potential of the first scanning line SCL (Gate) becomes equal to the VGL potential, and the second scanning line SCLM (GateM) becomes active. In the first embodiment, one sub pixel outputs gradation values in three bits as described with reference to FIG. 4, and thus a signal transmitted through the signal line DTL is a signal corresponding to information in three bits. More specifically, a one-bit signal is transmitted to each of the three pixels 49 included in one sub pixel, and thus, a signal in 1 [bit] [times] 3=3 [bits] is output to one sub pixel.

Figure 23:
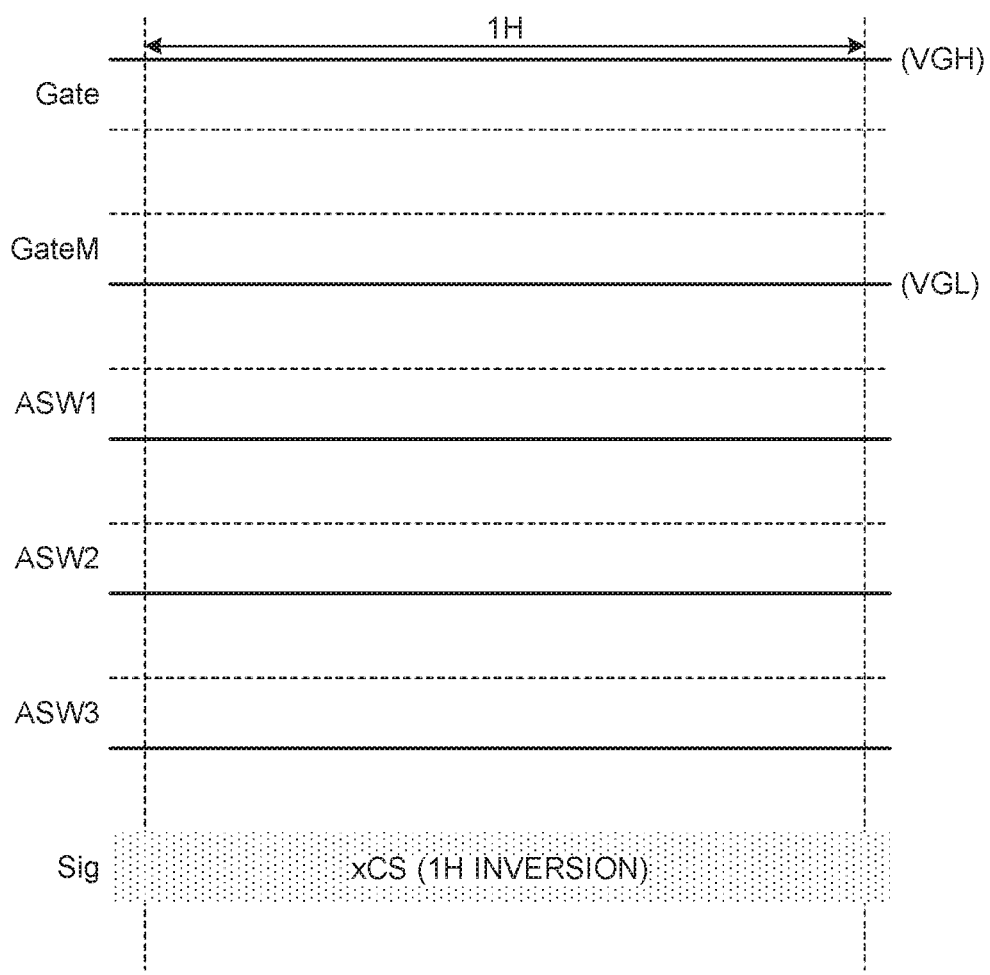
FIG. 23 is a timing chart illustrating an exemplary potential change in response to signal output related to one unit pixel in 1H duration in MM.

FIG. 23 is a timing chart illustrating an exemplary potential change in response to signal output related to one unit pixel in 1H duration in MM. In MM, the control unit 20 does not update display content of the pixel 49. Accordingly, the switches (ASW1, ASW2, and ASW3) for transmitting a signal from the signal line DTL to any one of the three sub pixels included in one unit pixel are maintained to be off. Simultaneously, the potential of the first scanning line SCL (Gate) becomes equal to the VGH potential, and the potential of the signal line DTL becomes a potential in accordance with the dedicated signal (xCS) supplied to the signal line DTL in MM. In MM, the MIP circuit 60 is maintained in a state (High or Low) set in the WMM duration, and thus the potential of the second scanning line SCLM (GateM) becomes equal to the VGL potential.

As described above, according to the first embodiment, the liquid crystal display device 1 includes the display unit 10 including the pixels 49 arranged in the row and column directions, each pixel 49 including the pixel drive circuit 50 configured to apply voltage to the liquid crystals in the display region configured to transmit light in accordance with voltage applied to the liquid crystals and the memory (MIP circuit 60) configured to store therein the one-bit signal indicating whether to apply voltage to the liquid crystals in the display region, and the control unit 20 configured to perform switching between the first mode (AM) causing the display unit 10 to perform display output in accordance with the gradation signal which is generated based on image data, and the second mode (MM) causing the display unit 10 to perform display output in accordance with the one-bit signal which is stored in the memory. This configuration achieves both of a display output function having gradation capability at more than two values in the first mode, and a memory function in the second mode. Switching can be performed between display output using the memory function in the second mode, and display output with the gradation capability at more than two values in the first mode.

Signals are input to the pixel 49 in the first duration (WMA duration) in which a signal for setting the memory to be the non-operational state is output when the pixel operates in the first mode, the second duration (AM duration) in which the gradation signal is output to the pixel drive circuit 50 when the pixel operates in the first mode, and the third duration (the WMM duration) in which the one-bit signal is output to the memory when the pixel 49 operates in the second mode. With this configuration, a change is made to the second duration through the first duration, which allows the display unit 10 operated in the second mode to change to the first mode. The display unit 10 operated in the first mode can be changed to the second mode through the third duration.

The display unit 10 includes the signal line DTL for transmitting the gradation signal and the one-bit signal, the first scanning line SCL for transmitting the first scanning signal (drive signal) which indicates whether to couple the pixel drive circuit 50 and the signal line DTL, and the second scanning line SCLM for transmitting the second scanning signal (the latch update signal) which indicates whether to couple the memory and the signal line DTL. With this configuration, selective use of the first scanning signal and the second scanning signal allows the transmission of the gradation signal to the pixel drive circuit 50 and the transmission of the one-bit signal to the memory to be performed through the signal line DTL in common.

The control unit 20 does not couple the pixel drive circuit 50 and the signal line DTL but couples the memory and the signal line DTL in the first duration and the third duration. The control unit 20 sets the memory to be the non-operational state in the first duration, and writes the one-bit signal to the memory in the third duration. In this manner, switching can be performed between the states of the memory in the first mode and the second mode.

The memory is coupled with wire (the wire VRAM) of the predetermined middle potential, and the one-bit signal is input to the memory as a signal indicating two values by high and low potentials with respect to the middle potential. This configuration allows the transmission of the one-bit signal to the memory to be performed by a simple method.

The pixel drive circuit 50 applies, to the liquid crystals, voltage due to a potential difference with respect to the reference electrode (the counter electrode 45) of the reference potential (VCOM) with a periodically inverting sign. The memory (MIP circuit 60) includes the first switch (TFT 71) for switching coupling and non-coupling between the pixel drive circuit 50 and the signal line DTL, and the second switch (the TFT 72) for switching coupling and non-coupling between the pixel drive circuit 50 and the reference electrode. The control unit 20 outputs the gradation signal to the signal line DTL when the pixel 49 operates in the first mode (AM), and outputs the memory setting signal (xCS) of a potential different from the reference potential (VCOM) to the signal line DTL when the pixel 49 operates in the second mode (MM). The control unit 20 couples the pixel drive circuit 50 and the signal line DTL but does not couple the pixel drive circuit 50 and the reference electrode when the pixel 49 operates in the first mode or when voltage is applied to the liquid crystals in the display region of the pixel 49 operating in the second mode. The control unit 20 does not couple the pixel drive circuit 50 and the signal line DTL but couples the pixel drive circuit 50 and the reference electrode when no voltage is applied the liquid crystals in the display region of the pixel 49 operating in the second mode. In this manner, a mechanism that voltage applied to the liquid crystals can be switched between the first mode and the second mode allows switching between the multiple gradation outputting in the first mode, and outputting through the turning on and off of the pixel 49 in the second mode.

Second Embodiment

The following describes a second embodiment of the present invention. Any configuration same as that in the first embodiment is denoted by the same reference numerals and symbols, and description thereof will be omitted in some cases. In the second embodiment, one horizontal scanning duration (1H) includes a duration that can be used as the first duration (WMA duration), the second duration (AM duration), and the third duration (WMM duration). When switching is performed between the first mode (AM) and the second mode (MM), one horizontal scanning duration includes at least one of a duration in which the first duration (WMA duration) and the second duration (AM duration) are continuous, or a duration in which the second duration (AM duration) and the third duration (WMM duration) are continuous. In the first duration (WMA duration) and the third duration (WMM duration), no gradation signal is output to the pixel drive circuit 50. The specific configuration (hardware) of a liquid crystal display device according to the second embodiment is the same as that in the first embodiment.

Figure 24:
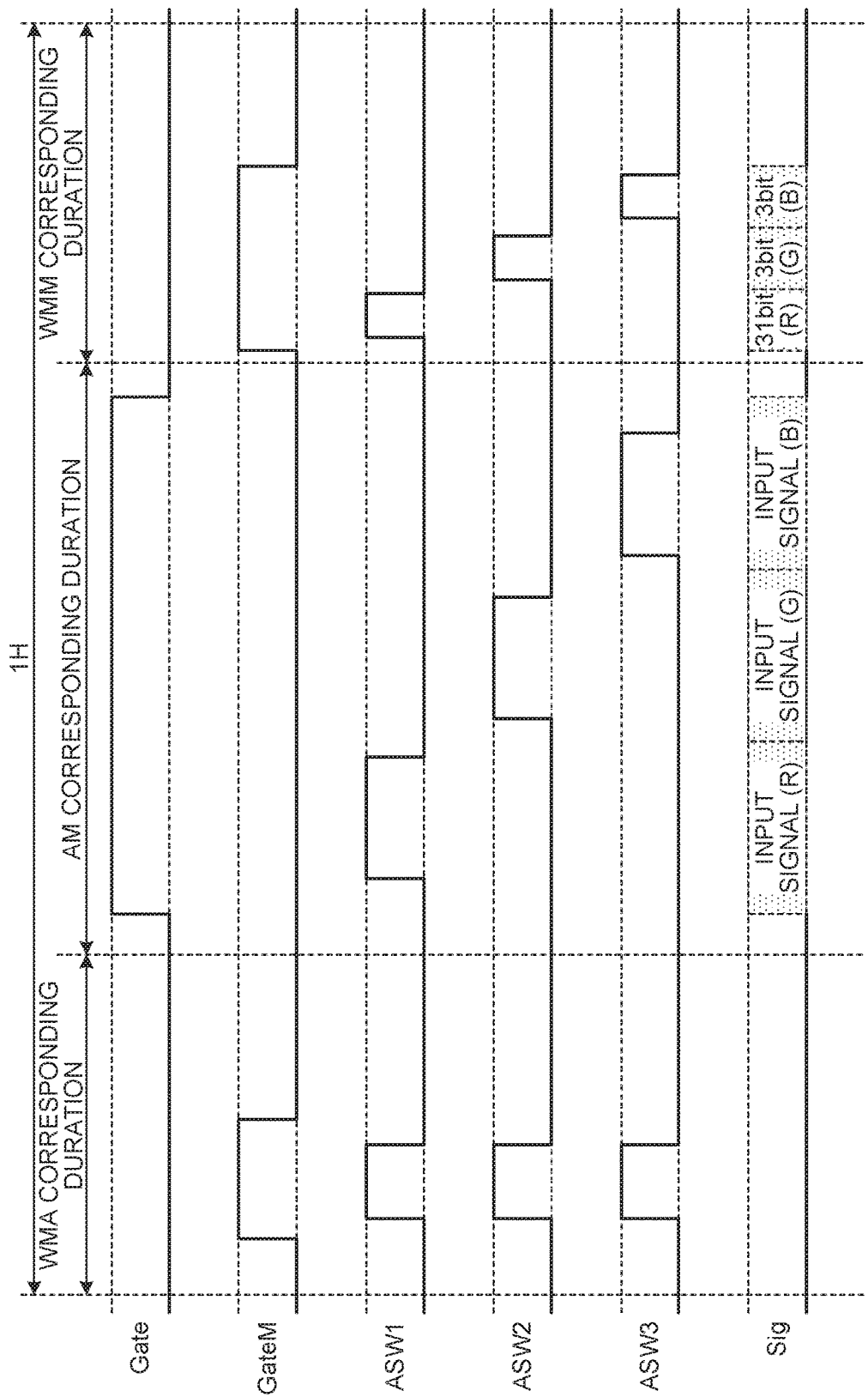
FIG. 24 is a schematic diagram illustrating exemplary setting of durations that are included in 1H and can be used as WMA, AM, and WMM.

FIG. 24 is a schematic diagram illustrating an exemplary setting of durations that are included in 1H and can be used as WMA, AM, and WMM. In the description of the second embodiment, "WMA corresponding duration" refers to a duration used for processing related to the first duration (WMA duration), "AM corresponding duration" refers to a duration used for processing related to the second duration (AM duration), and "WMM corresponding duration" refers to a duration used for processing related to the third duration (WMM duration). As illustrated in FIG. 24, in the second embodiment, the WMA corresponding duration, the order of the AM corresponding duration, and the WMM corresponding duration is set to be continuous in 1H duration. The control unit 20 according to the second embodiment performs processing corresponding to these durations in 1H duration depending on a mode. Specifically, the control unit 20 according to the second embodiment performs, in the WMA corresponding duration, the signal output in WMA described with reference to, for example, FIG. 20 in the first embodiment. The control unit 20 according to the second embodiment performs, in the AM corresponding duration, the signal output in AM described with reference to, for example, FIG. 21 in the first embodiment. The control unit 20 according to the second embodiment performs, in the WMM corresponding duration, the signal output in WMM described with reference to, for example, FIG. 22 in the first embodiment.

FIG. 24 illustrates signal output possibilities that can be included in 1H duration with regard to the second embodiment, but not indicating that all signal outputs in WMA, AM, and WMM are continuous in 1H duration with regard to the first embodiment. In the following, signal output patterns in 1H duration with regard to the second embodiment are exemplarily described with reference to FIGS. 25 to 28.

Figure 25:
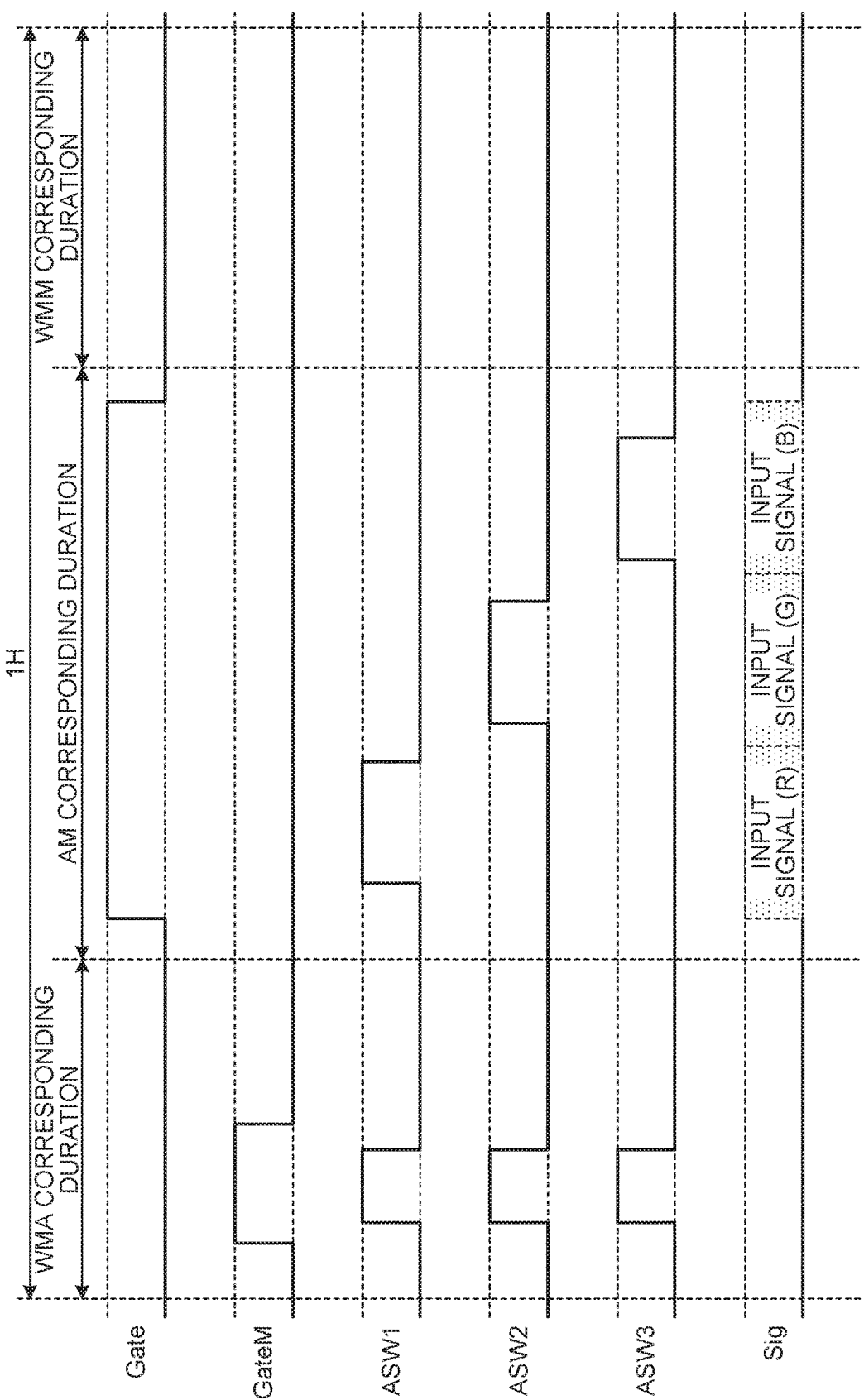
FIG. 25 is a timing chart illustrating exemplary signal output in 1H in the first frame during an AM operation.

FIG. 25 is a timing chart illustrating exemplary signal output of 1H in the first frame during an AM operation. Resetting of the MIP circuit 60 is performed in the first frame during the AM operation before start of the multiple gradation outputting, and thus, in the WMA corresponding duration, the control unit 20 performs the signal output in WMA, in other words, signal output related to processing of setting the MIP circuit 60 to be Low. In the AM corresponding duration in the 1H duration which is the same as the duration in which the MIP circuit 60 is set to be Low, the control unit 20 performs outputting of signals (signals to the first scanning line SCL and the switches ASW1, ASW2, and ASW3) for causing each sub pixel to perform outputting of the gradation signal generated based on an image signal of the first frame and outputting in accordance with this gradation signal. In other words, right before the AM corresponding duration in the first frame, the control unit 20 performs the processing related to WMA for mode switching in the 1H duration including the AM corresponding duration in this first frame.

Figure 26:
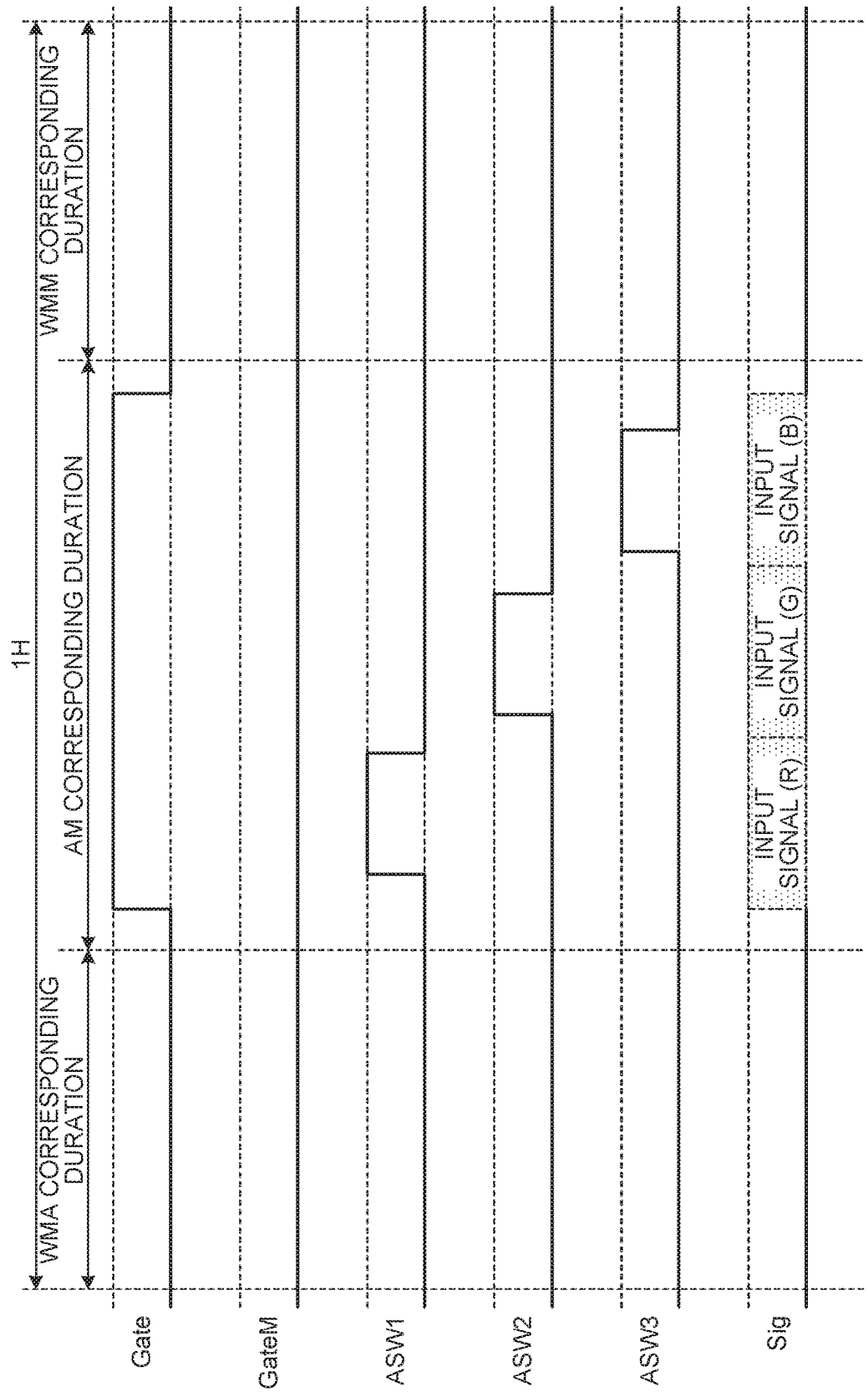
FIG. 26 is a timing chart illustrating exemplary signal output in 1H in the second frame or later the AM operation.

FIG. 26 is a timing chart illustrating exemplary signal output of 1H in the second frame or later during the AM operation. In the second frame or later during the AM operation, the control unit 20 does not perform signal output in the WMA corresponding duration, but performs signal output for the multiple gradation outputting in the AM corresponding duration.

As illustrated in FIGS. 25 and 26, in the AM operation in which the mode does not change to MM, the control unit 20 does not perform signal output in the WMM corresponding duration.

Figure 27:
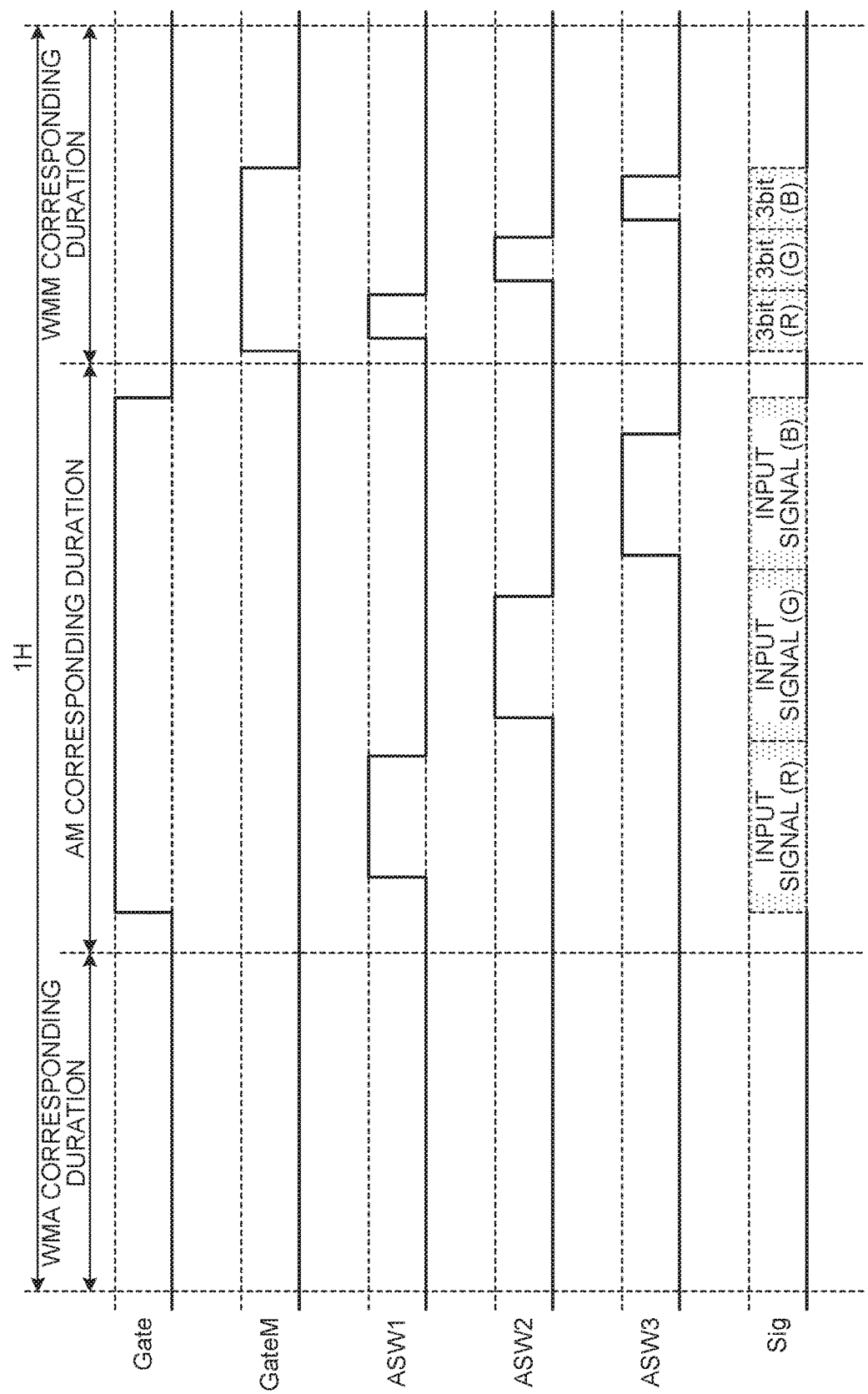
FIG. 27 is a timing chart illustrating exemplary signal output in 1H in the first frame during a MM operation.

FIG. 27 is a timing chart illustrating exemplary signal output of 1H in the first frame during a MM operation. In the first frame during the MM operation, the setting (High or Low) of the MIP circuit 60 is performed before one-bit outputting by each pixel 49 and three-bit outputting by each sub pixel, and thus, in the WMM corresponding duration, the control unit 20 performs the signal output in WMM, in other words, signal output related to the setting of the MIP circuit 60. FIG. 27 illustrates a timing chart when the mode changes to MM after start of the AM operation. When the start-up setting is MM, in FIG. 27, no signal output is performed in the AM corresponding duration.

Figure 28:
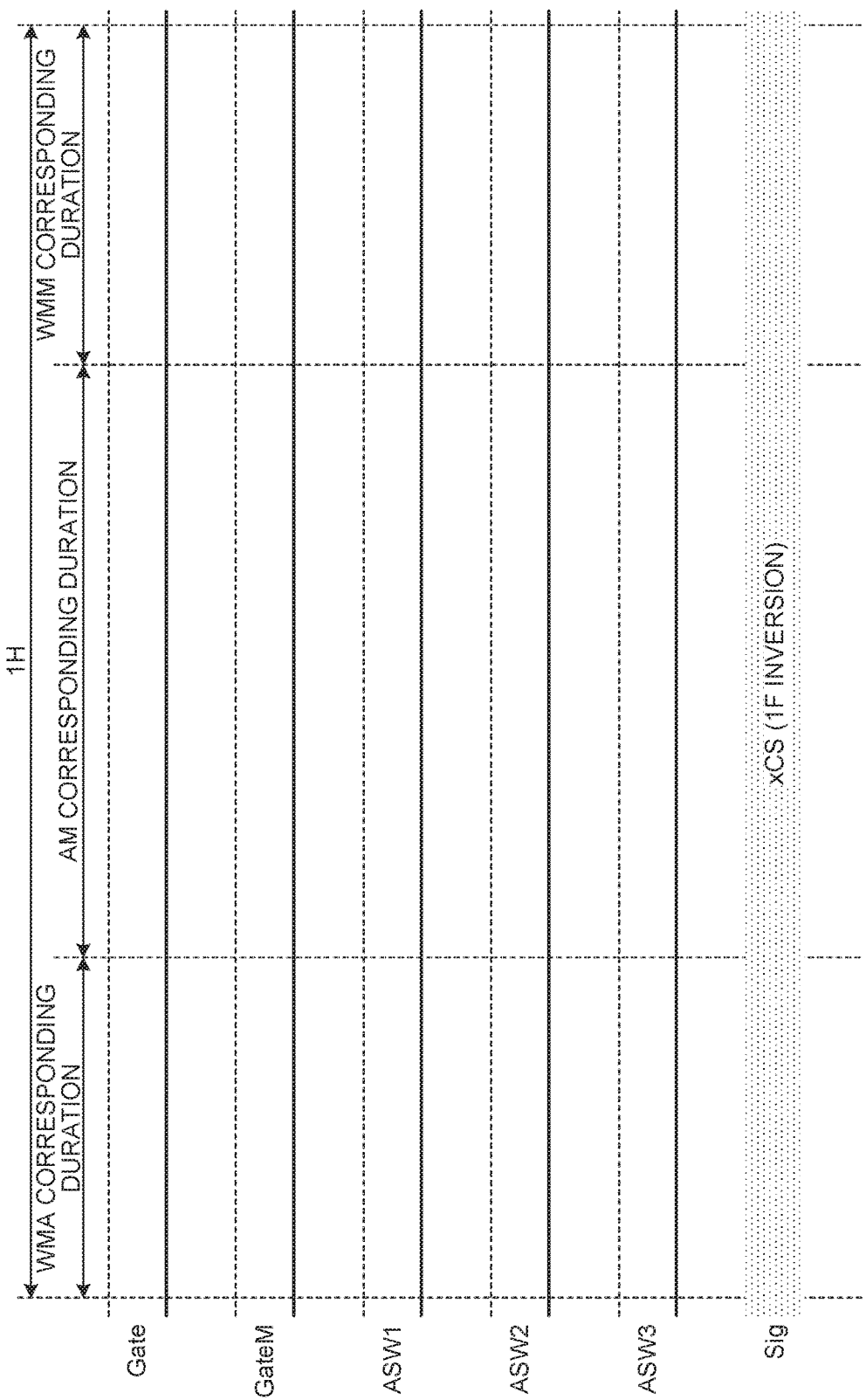
FIG. 28 is a timing chart illustrating exemplary signal output in 1H in the second frame or later during the MM operation.

FIG. 28 is a timing chart illustrating exemplary signal output of 1H in the second frame or later during the MM operation. In the second frame or later during the MM operation, the setting and resetting of the MIP circuit 60 are not needed, and thus the control unit 20 does not perform signal output in the WMA corresponding duration and the WMM corresponding duration. The dedicated signal (xCS) supplied to the signal line DTL during the MM operation is supplied continuously in 1H duration including the WMA corresponding duration and the WMM corresponding duration. When switching of display content is performed in the MM operation while the mode is maintained, the control unit 20 outputs, in the WMM corresponding duration of the timing chart illustrated in FIG. 28, a signal same as a signal in the WMM corresponding duration illustrated in FIG. 27.

Figure 29:
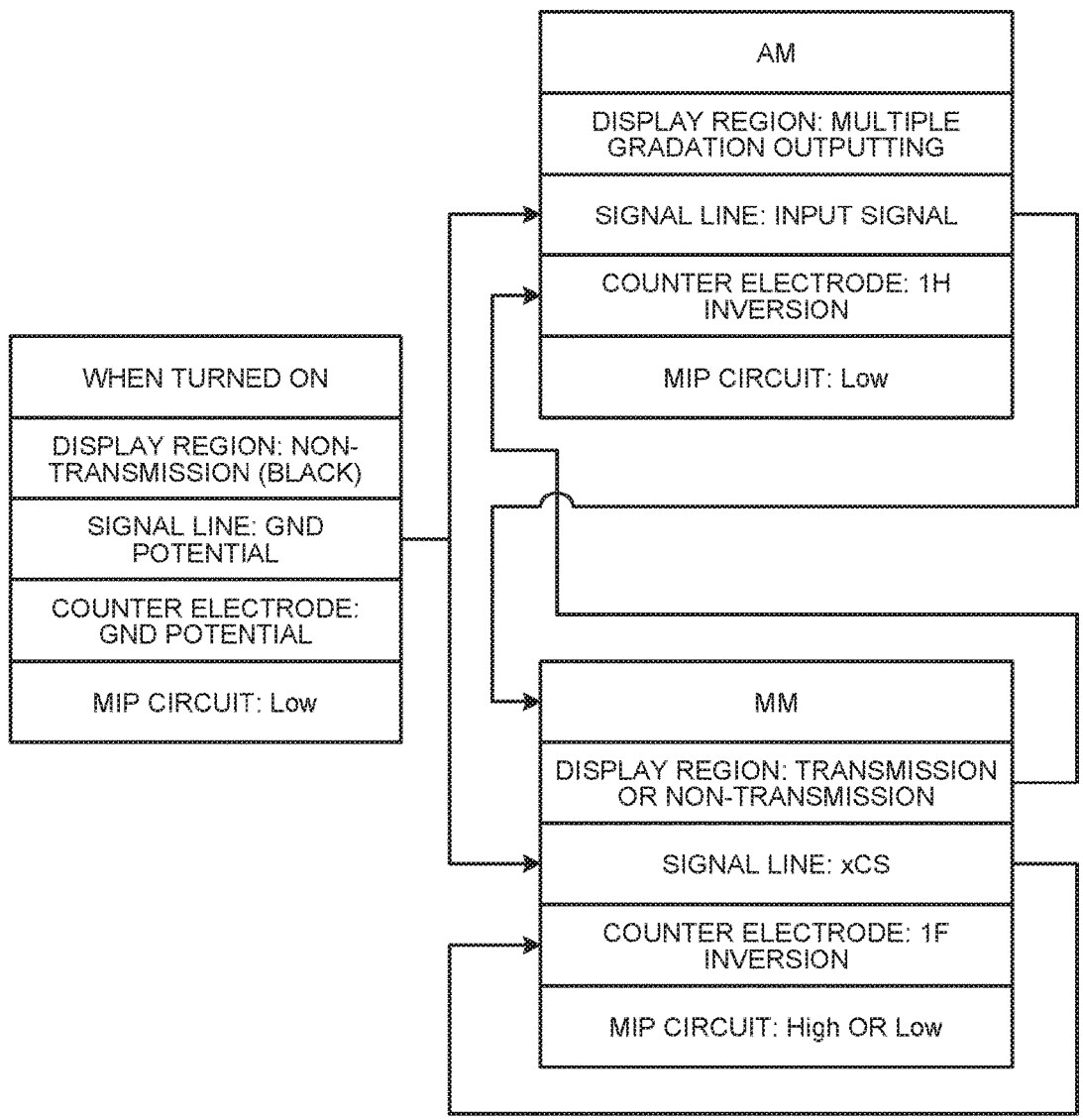
FIG. 29 is a diagram illustrating the process of a mode change of the liquid crystal display device in a second embodiment.

FIG. 29 is a diagram illustrating the process of a mode change of the liquid crystal display device in the second embodiment. In the second embodiment, 1H duration includes the WMA corresponding duration and the WMM corresponding duration, and thus the processing in WMA and WMM performed through 1F duration in the first embodiment may be omitted. Accordingly, as illustrated in FIG. 29, the change between AM and MM and the switching of display content in MM can be performed in each 1F.

As described above, according to the second embodiment, one horizontal scanning duration as the duration of signal input to the predetermined number of pixel rows includes a duration that can be used as the first duration, the second duration, and the third duration. Accordingly, without spending 1F duration to perform WMA and WMM, the change between AM and MM and the switching of display content in MM can be performed in each 1F. Thus, the mode switching between AM and MM and the switching of display content in MM can be performed faster.

Third Embodiment

The following describes a third embodiment of the present invention. Any configuration same as those in the first and the second embodiments is denoted by the same reference numerals and symbols, and description thereof will be omitted in some cases.

Figure 30:
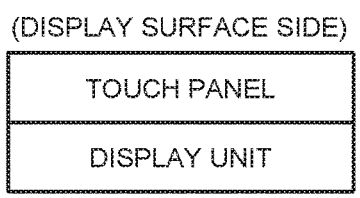
FIG. 30 is a schematic diagram illustrating an exemplary laminated structure of a liquid crystal display device according to a third embodiment.

FIG. 30 is a schematic diagram illustrating an exemplary laminated structure of a liquid crystal display device according to the third embodiment. The liquid crystal display device according to the third embodiment includes, in addition to the configuration in the second embodiment, a touch panel 90 serving as a touch detecting unit configured to detect a touch operation on the display surface of the display unit 10. Any component of the liquid crystal display device in the third embodiment is the same as that in the first embodiment except for the touch panel 90.

Figure 31:
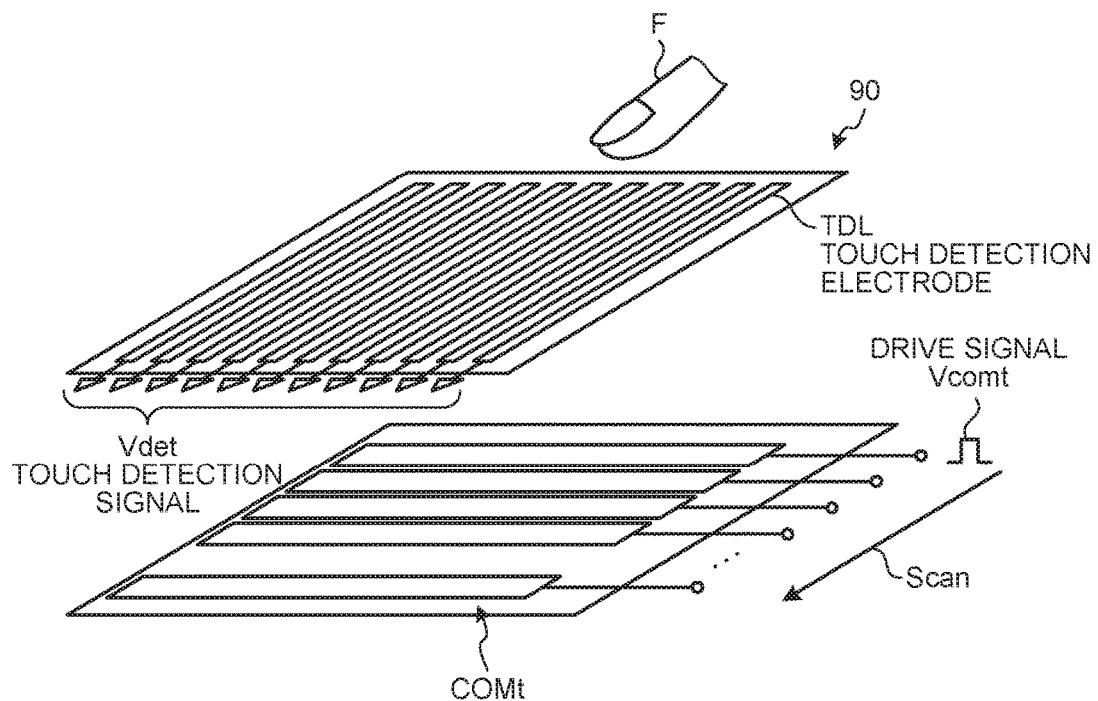
FIG. 31 is an exploded perspective view illustrating an exemplary main configuration of a touch detecting unit.

FIG. 31 is an exploded perspective view illustrating an exemplary main configuration of the touch panel 90. The touch panel 90 includes a touch detection electrode TDL and a touch detection drive electrode COMt. A layer in which the touch detection electrode TDL is provided and a layer in which the touch detection drive electrode COMt is provided are provided so as not be in contact with each other at a predetermined distance therebetween. The touch detection electrode TDL and the touch detection drive electrode COMt have longitudinal directions different from each other, and have a twisted positional relation.

At operation of the touch panel 90, in other words, at the time at which touch detection is performed by the touch panel 90, the control unit 20 outputs a touch detection drive signal Vcomt to the touch detection drive electrode COMt. Capacitance is generated between the touch detection electrode TDL and the touch detection drive electrode COMt in response to the outputting of the drive signal Vcomt. When an object such as a finger F becomes adjacent or contact to the display surface on which the touch panel 90 is provided, this capacitance changes. The control unit 20 performs touch detection by detecting this capacitance change as a touch detection signal Vdet.

A plurality of the touch detection electrodes TDL and the touch detection drive electrodes COMt are provided. The control unit 20 performs a scanning operation (Scan) to output the drive signal Vcomt on the touch detection drive electrodes COMt in parallel at different timings. Based on the touch detection drive electrode COMt to which the drive signal Vcomt is output, and the touch detection electrode TDL by which the touch detection signal Vdet is detected at the timing of the drive signal Vcomt output, a position where the object is adjacent or contact to the display surface is determined.

The touch panel 90 described with reference to FIGS. 30 and 31 is provided separately from the display unit 10, but an in-cell touch panel liquid crystal display, in which the display unit 10 and the touch panel 90 are integrated with each other, is applicable. A touch detection method is not limited to the specific configuration of the touch panel 90. For example, what is called a self matrix method is applicable in which signal detection is performed by applying drive voltage to each of electrodes arranged in a matrix. In this case, the same electrode corresponds to the touch detection electrode TDL and the touch detection drive electrode COMt in the touch panel 90. In another method in touch detection, tiled electrodes are provided in the row and column directions and coupled with each other through bridge wiring in the row and column directions so as to achieve a single layer type that the touch detection electrode TDL and the touch detection drive electrode COMt are formed in an identical layer.

A touch detection duration in which detection of a touch operation is performed by the touch panel 90 in the third embodiment is a duration in which no signal transmission is performed through the first scanning line SCL and the second scanning line SCLM. The following describes relation between the touch detection duration and a signal output timing in each mode with reference to FIGS. 32 to 36. The touch detection duration in FIG. 32 to FIG. 36 is "ON" duration in "TPScan". The touch detection duration is a duration in which the touch detection drive signal Vcomt described above is output.

Figure 32:
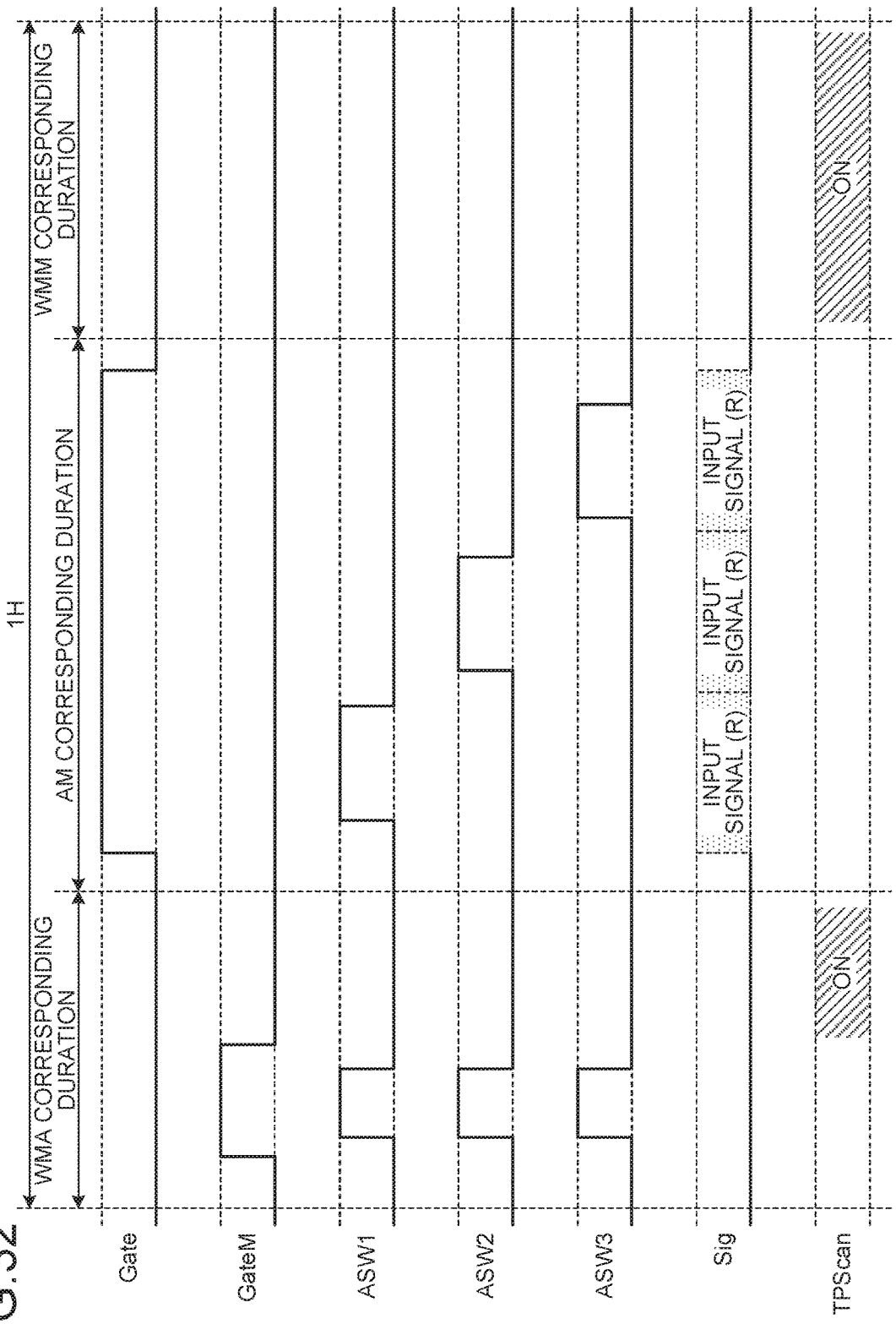
FIG. 32 is a timing chart illustrating an exemplary relation between signal output and a touch detection duration in 1H in the first frame during the AM operation.

FIG. 32 is a timing chart illustrating an exemplary relation between signal output and the touch detection duration of 1H in the first frame during the AM operation. As described with reference to FIG. 25 in the second embodiment, in the AM operation in which the mode does not change to MM, the control unit 20 does not perform signal output in the WMM corresponding duration. Thus, in the first frame during the AM operation, the touch detection duration can be set to be in the WMM corresponding duration, and thus signal output related to the display output by the display unit 10 and the touch detection by the touch panel 90 can be performed at different timings.

When the touch detection is performed simultaneously at a timing at which the signal output related to the display output by the display unit 10 is performed, noise occurring in the signal output related to the display output by the display unit 10 is likely to affect the accuracy of the touch detection through its influence on the capacitance of the touch panel 90. The signal output related to the display output by the display unit 10 and the touch detection by the touch panel 90 are performed at different timings, and thus the influence of external noise in the touch detection can be reduced.

As illustrated in FIG. 32, the first frame during the AM operation includes a duration in which no signal output is performed until the AM corresponding duration starts after the timing of signal output in the WMA corresponding duration. Thus, the touch detection duration may be set also in this duration.

Figure 33:
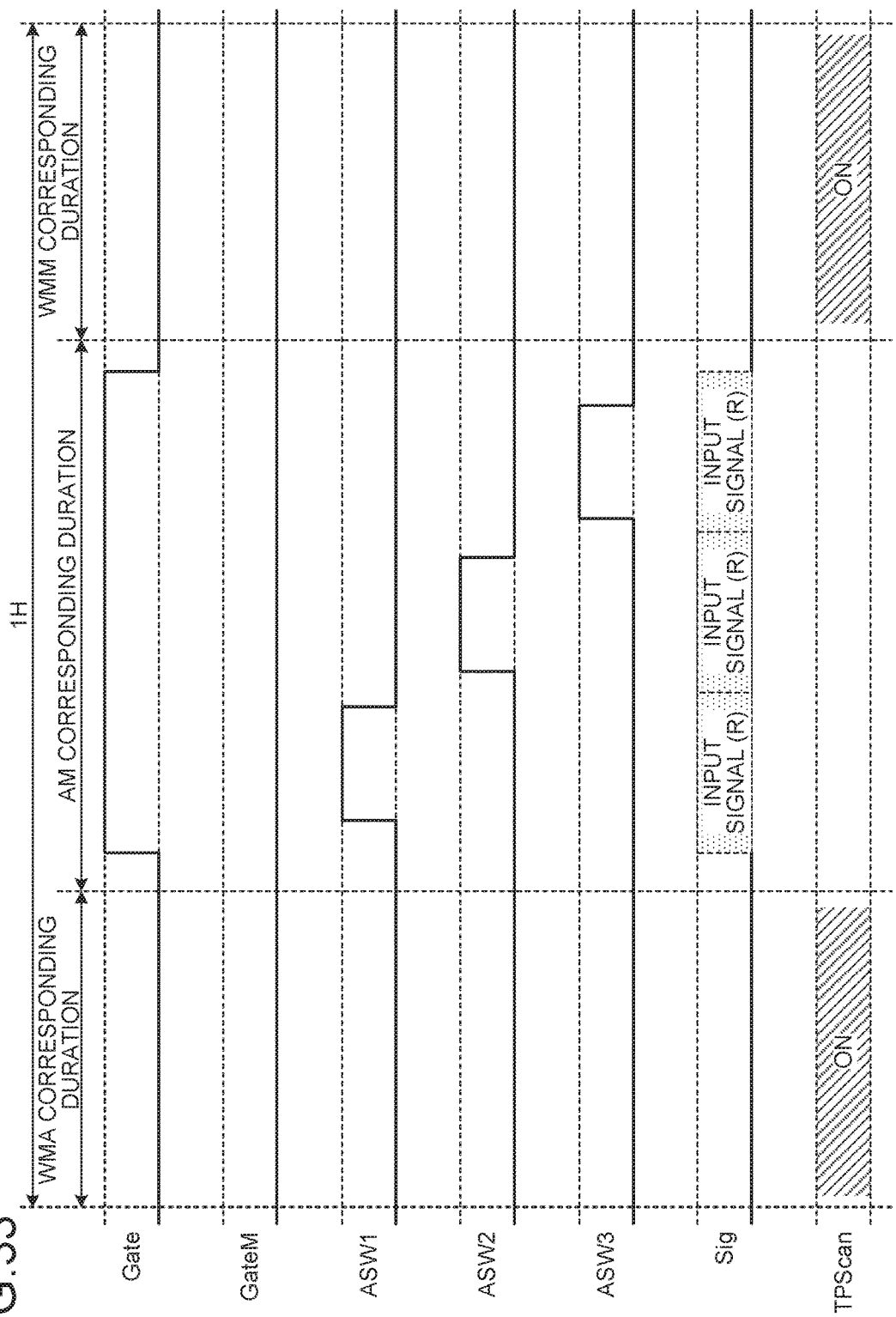
FIG. 33 is a timing chart illustrating an exemplary relation between the signal output and the touch detection duration in 1H in the second frame or later the AM operation.

FIG. 33 is a timing chart illustrating an exemplary relation between signal output and the touch detection duration of 1H in the second frame or later during the AM operation. As described with reference to FIG. 26 in the second embodiment, in the second frame or later during the AM operation, the control unit 20 does not perform signal output in the WMA corresponding duration and the WMM corresponding duration. Thus, in the second frame or later during the AM operation, the touch detection duration can be set to be in the WMA corresponding duration and the WMM corresponding duration, and thus the signal output related to the display output by the display unit 10 and the touch detection by the touch panel 90 can be performed at different timings.

Figure 34:
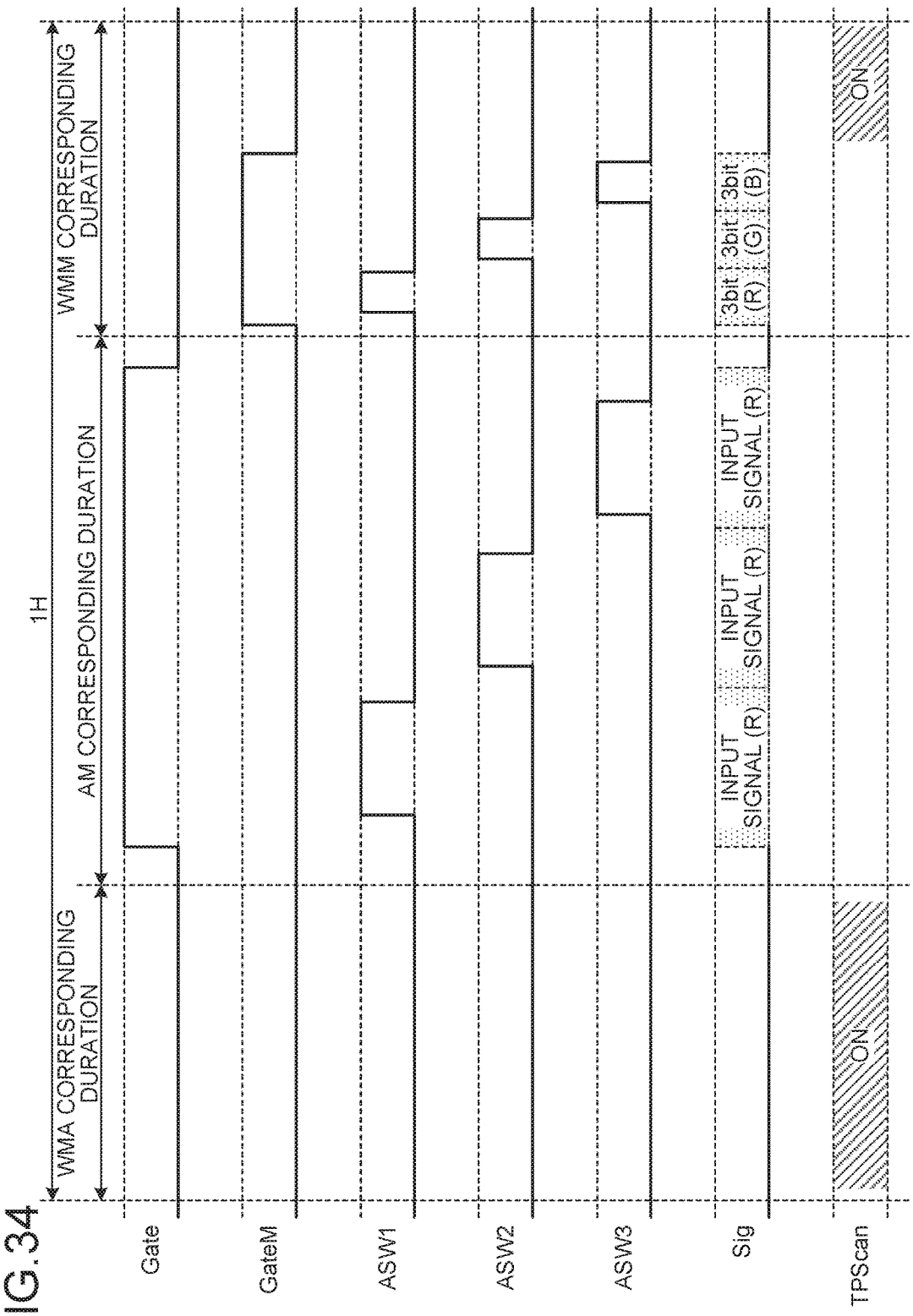
FIG. 34 is a timing chart illustrating an exemplary relation between the signal output and the touch detection duration in 1H in the first frame during the MM operation.

FIG. 34 is a timing chart illustrating an exemplary relation between signal output and the touch detection duration of 1H in the first frame during the MM operation. As described with reference to FIG. 27 in the second embodiment, during the MM operation, the control unit 20 does not perform signal output in the WMA corresponding duration. Thus, in the first frame during the MM operation, the touch detection duration can be set to be in the WMA corresponding duration, and thus the signal output related to the display output by the display unit 10 and the touch detection by the touch panel 90 can be performed at different timings.

As illustrated in FIG. 34, the first frame during the MM operation includes a duration in which no signal output is performed until the WMA corresponding duration in the next frame starts after the timing of signal output in the WMM corresponding duration. Thus, the touch detection duration may be set also in this duration.

Figure 35:
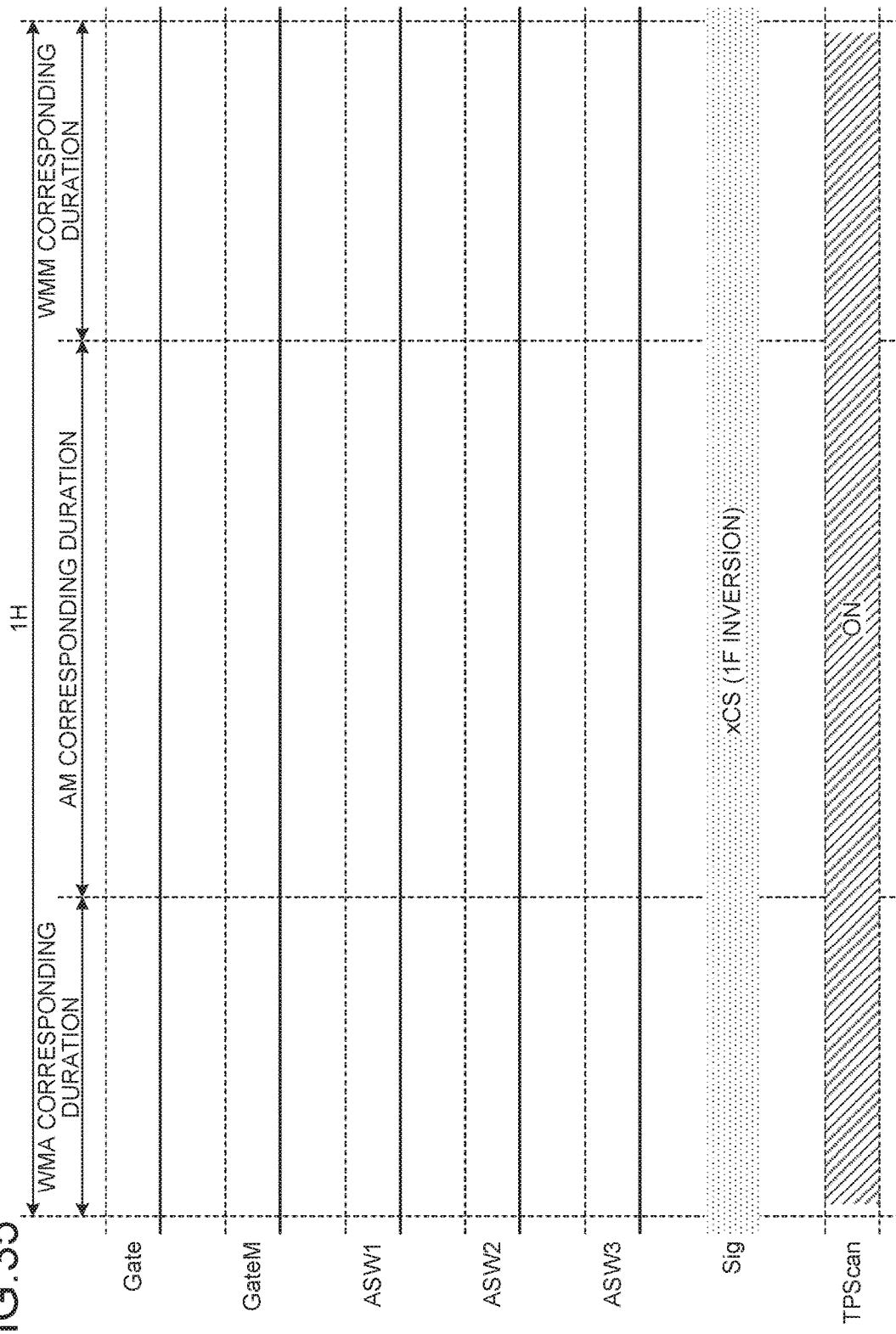
FIG. 35 is a timing chart illustrating an exemplary relation between the signal output and the touch detection duration in 1H in the second frame or later during the MM operation.

FIG. 35 is a timing chart illustrating an exemplary relation between signal output and the touch detection duration of 1H in the second frame or later during the MM operation. As described in the first embodiment, during the MM operation, the potential of the signal line DTL and the potential of the counter electrode 45 are inverted in each frame. In this case, the control unit 20 does not perform individual signal output to each pixel 49. Accordingly, in the second frame during the MM operation, the WMA corresponding duration, the AM corresponding duration, and the WMM corresponding duration can be used as the touch detection duration.

FIG. 32 to FIG. 35 illustrate the examples in which different touch detection durations are set in the first frame during the AM operation, the second frame or later during the AM operation, the first frame during the MM operation, and the second frame or later during the MM operation. However, the same rule may be applied to set touch detection durations in part or all of these frames.

Figure 36:
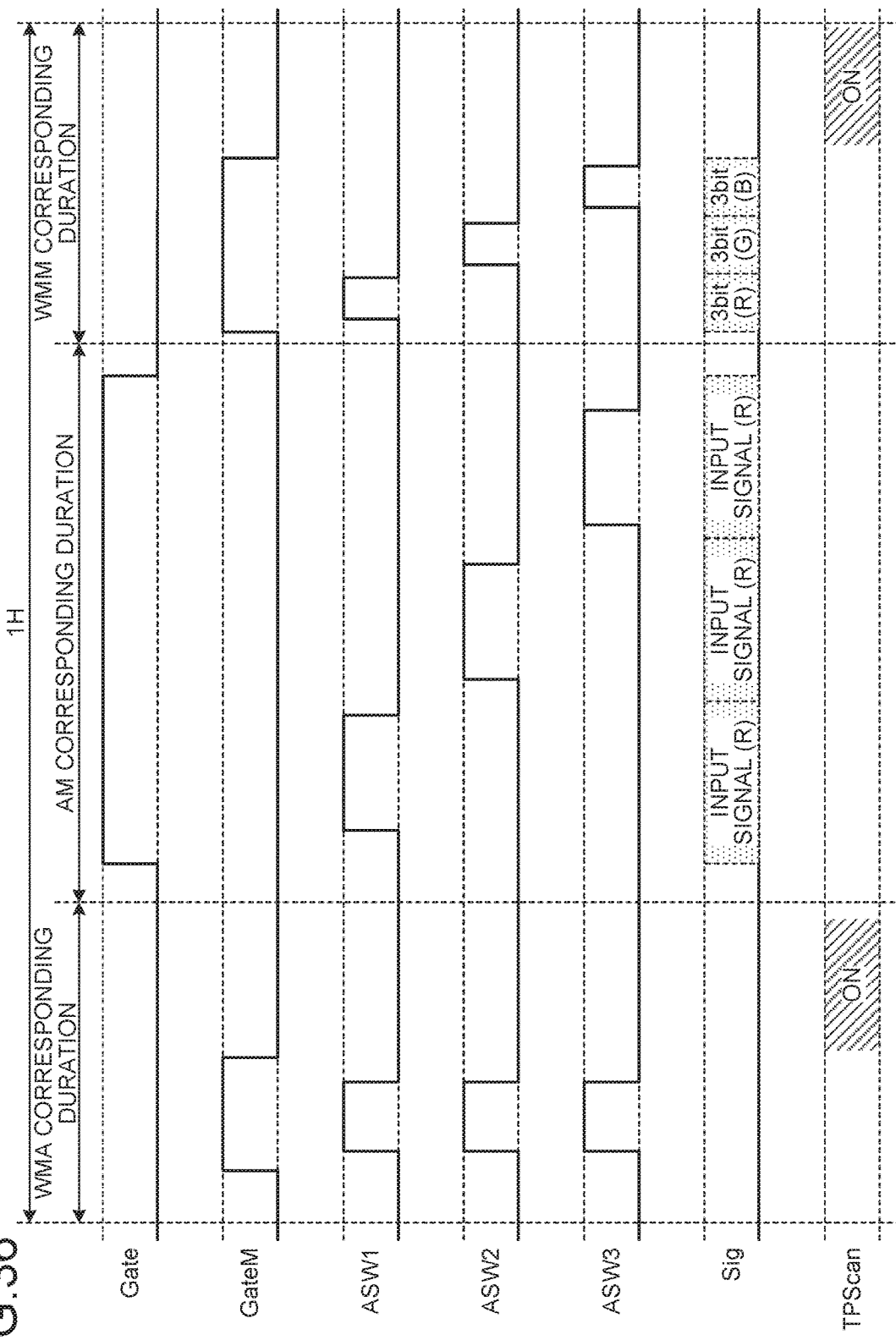
FIG. 36 is a diagram illustrating another exemplary relation among durations that are included in 1H and can be used as WMA, AM, and WMM, and the touch detection duration.

FIG. 36 is a diagram illustrating another exemplary relation among durations that are included in 1H and can be used as WMA, AM, and WMM, and the touch detection duration. In any of the first frame during the AM operation, the second frame or later during the AM operation, the first frame during the MM operation, the second frame or later during the MM operation, the control unit 20 performs no signal output to each pixel 49 in a duration until the AM corresponding duration starts after the timing of signal output in the WMA corresponding duration, and in a duration until the WMA corresponding duration in the next frame starts after the timing of signal output in the WMM corresponding duration. Thus, as illustrated in FIG. 36, touch detection durations are set to be the duration until the AM corresponding duration starts after the timing of signal output in the WMA corresponding duration, and the WMA corresponding duration in the next frame after the timing of signal output in the WMM corresponding duration, and thus, regardless of any timing of the first frame during the AM operation, the second frame or later during the AM operation, the first frame during the MM operation, and the second frame or later during the MM operation, the signal output related to the display output by the display unit 10 and the touch detection duration by the touch panel 90 can be performed at different timings.

As described above, according to the third embodiment, no signal transmission is performed through the first scanning line SCL and the second scanning line SCLM in the touch detection duration in which the touch detecting unit (touch panel 90) performs detection of a touch operation. This allows reduction in the influence of external noise in the touch detection, thereby further improving the accuracy of the touch detection.

It should be understood that the present invention provides any effect other than those achieved by the aspects described in the embodiments, that is clear from description of the present specification or can be thought of by the skilled person in the art as appropriate.

For example, a setting signal is a one-bit signal in the above-described embodiments, which is exemplary and does not limit the present invention. The setting signal may be a signal in two bits or more. The memory is configured to store therein the amount of information in accordance with the number of bits of the setting signal.

The characteristics of the present invention can be described as follows.

(1) A liquid crystal display device including:
a display unit configured to pixels in a display region, a pixel drive circuit configured to apply voltage to liquid crystals, a memory configured to store therein a setting signal in at least one bit indicating whether to apply voltage to the liquid crystals in the display region, and two switch elements of a first switch and a second switch for switching coupling with the pixel drive circuit; and
a controller configured to rewrite the setting signal stored in the memory when a mode in which the display unit is operated is switched, between a first mode causing the display unit to perform display output in accordance with a gradation signal generated based on image data in the case of turning on one of the two switch elements, and a second mode causing the display unit to perform display output in accordance with a setting signal stored in the memory in the case of turning on any one of the two switch elements.

(2) The liquid crystal display device according to (1), in which
a pixel of the pixels includes a third switch that couples the memory and a wire through which the setting signal is transmitted, and
the controller is configured to turn on the third switch element to rewrite the setting signal stored in the memory when performing switching between the first mode and the second mode.

(3) The liquid crystal display device according to (1), in which a duration of signal input to a pixel of the pixels is one of a first duration in which a signal for setting the memory to be a non-operational state is output when the pixel operates in the first mode, a second duration in which the gradation signal is output to the pixel drive circuit when the pixel operates in the first mode, and a third duration in which the setting signal is output to the memory when the pixel operates in the second mode.

(4) The liquid crystal display device according to (3), in which one horizontal scanning duration as a duration of signal input to a predetermined number of pixel rows includes a duration that can be used as the first duration, the second duration, and the third duration.

(5) The liquid crystal display device according to (3), in which, when switching is performed between the first mode and the second mode, one horizontal scanning duration includes at least one of a duration in which the first duration and the second duration are continuous or a duration in which the second duration and the third duration are continuous.

(6) The liquid crystal display device according to (3), in which the gradation signal is not output to the pixel drive circuit in the first duration and the third duration.

(7) The liquid crystal display device according to (1), in which the display unit includes:
a signal line through which the gradation signal and the setting signal are transmitted,
a first scanning line through which a first scanning signal indicating whether to couple the pixel drive circuit and the signal line is transmitted, and
a second scanning line through which a second scanning signal indicating whether to couple the memory and the signal line is transmitted.

(8) The liquid crystal display device according to (7), further including a touch detecting unit configured to detect a touch operation, in which no signal transmission is performed through the first scanning line and the second scanning line in a touch detection duration in which the touch detecting unit performs the detection of the touch operation.

(9) The liquid crystal display device according to (7) or (8), in which the controller is configured not to couple the pixel drive circuit and the signal line but couples the memory and the signal line in the first duration and the third duration, the controller is configured to set the memory to a non-operational state in the first duration, and the controller is configured to write the setting signal to the memory in the third duration.

(10) The liquid crystal display device according to (9), in which
the memory is coupled with a wire at a predetermined middle potential, and
the setting signal is input to the memory as a signal indicating two values by high and low potentials with respect to the middle potential.

(11) The liquid crystal display device according to any one of (7) to (10), in which
the pixel drive circuit is configured to apply, to the liquid crystals, voltage due to a potential difference with respect to a reference electrode of a reference potential,
the first switch is configured to switch coupling and non-coupling between the pixel drive circuit and the signal line,
the second switch is configured to switch coupling and non-coupling between the pixel drive circuit and the reference electrode, and
the controller is configured to output the gradation signal to the signal line when a pixel of the pixels operates in the first mode, to output a memory setting signal having a potential different from the reference potential to the signal line when the pixel operates in the second mode, the controller is configured to couple the pixel drive circuit and the signal line but not to couple the pixel drive circuit and the reference electrode when the pixel operates in the first mode or when voltage is applied to the liquid crystals of the pixel operating in the second mode, and the controller is configured not to couple the pixel drive circuit and the signal line but to couple the pixel drive circuit and the reference electrode when no voltage is applied to the liquid crystals of the pixel operating in the second mode.

(12) The liquid crystal display device according to (11), in which, in the first mode, the sign of the reference potential is inverted in each horizontal scanning duration, and in the second mode, a sign of the reference potential is inverted in one vertical scanning duration.

The characteristics of the present invention can be also described as follows.

(13) A liquid crystal display device including:
a display unit including a plurality of pixels configured to transmit light depending on voltage applied to the liquid crystals,
a signal line through which a gradation signal for applying voltage corresponding to a gradation value of each pixel is transmitted, and
a reference electrode of a predetermined reference potential, in which
each pixel of the plurality of pixels includes:
a pixel drive circuit configured to apply voltage in accordance with a potential difference with respect to the reference potential to the liquid crystals,
a first switch configured to switch coupling and non-coupling between the pixel drive circuit and the signal line,
a second switch configured to switch coupling and non-coupling between the pixel drive circuit and the reference electrode, and
a memory configured to store therein a setting signal indicating whether to apply voltage to the liquid crystals,
one of switch elements of the first switch and the second switch is configured to be turned on and the other switch element is configured to be turned off depending on the setting signal stored in the memory, and
the setting signal is written to the memory before start of a first mode in which voltage in accordance with the gradation signal is applied to the liquid crystals and before start of a second mode in which it is determined whether to apply voltage to the liquid crystals depending on the setting signal.

(14) A liquid crystal display device including:
a display unit including a display region provided with a plurality of pixels arranged in row and column directions and configured to transmit light depending on voltage applied to the liquid crystals;
a signal line through which a plurality of kinds of signals are transmitted; and
a reference electrode of a predetermined reference potential, in which
each pixel includes:
a pixel drive circuit configured to apply voltage to the liquid crystals in the display region,
a memory configured to store therein the setting signal,
a first switch configured to switch coupling and non-coupling between the pixel drive circuit and the signal line,
a second switch configured to switch coupling and non-coupling between the pixel drive circuit and the reference electrode, and
a third switch configured to switch coupling and non-coupling between the signal line and the memory, the plurality of kinds of signals include a gradation signal for applying voltage corresponding to a gradation value of the pixel to the liquid crystals and a setting signal indicating whether to apply voltage to the liquid crystals,
one of switch elements of the first switch and the second switch is turned on and the other switch element is turned off depending on the setting signal stored in the memory, and
the third switch is turned on to write the setting signal to the memory before start of a first mode in which voltage in accordance with the gradation signal is applied to the liquid crystals and before start of a second mode in which it is determined whether to apply voltage to the liquid crystals depending on the setting signal.

(15) The liquid crystal display device according to (13), further including a third switch configured to switch coupling and non-coupling between the signal line and the memory, in which the third switch is turned on to write the setting signal to the memory before start of the first mode and before start of the second mode.

(16) The liquid crystal display device according to (13) or (15), in which, when switching is performed from the first mode to the second mode, in one horizontal scanning duration, the gradation signal is transmitted to the pixel drive circuit through the signal line, and then the setting signal is transmitted to the memory, so that the first switch is turned on and the second switch is turned off.

(17) The liquid crystal display device according to (16), in which, when switching is performed from the second mode to the first mode, one horizontal scanning duration includes a duration including a timing at which the gradation signal is transmitted to the pixel drive circuit through the signal line in the first mode, and a duration in which the setting signal is transmitted to the memory, so that the first switch is turned on and the second switch is turned off, and the gradation signal is not transmitted to the pixel drive circuit.

(18) The liquid crystal display device according to (16) or (17), in which, when switching is performed from the first mode to the second mode, the gradation signal is not transmitted to the pixel drive circuit in the one horizontal scanning duration, in a duration in which the setting signal is transmitted to the memory, so that the first switch is turned on and the second switch is turned off.

What is claimed is:

1. A liquid crystal display device comprising:
pixels arranged in a display region, at least one of the pixels including
a memory configured to store a setting signal,
a first switch having a first gate, a first source, and a first drain and a second switch having a second gate, a second source and a second drain, the memory being coupled to the first gate and the second gate;
a signal line coupled to one of the first source and the first drain; and
a controller configured to rewrite the setting signal stored in the memory when a display operation mode is switched between
a first mode in which the first switch is turned on and the pixel performs display output in accordance with a gradation signal that is generated based on image data and provided through the first switch and the signal line, and
a second mode in which any of the first or second switches is turned on and the pixel performs display output in accordance with the setting signal stored in the memory.

2. The liquid crystal display device according to claim 1, wherein the pixel includes a third switch that couples the memory and a wire through which the setting signal is transmitted, and the controller is configured to turn on the third switch to rewrite the setting signal stored in the memory when switching between the first mode and the second mode.

3. The liquid crystal display device according to claim 1, wherein a duration of signal input to the pixel is one of:

a first duration in which a signal for setting the memory to turn on the first switch is output in the first mode;

a second duration in which the gradation signal is output to the pixel in the first mode; and a third duration in which the setting signal is output to the memory when the pixel operates in the second mode.

4. The liquid crystal display device according to claim 3, wherein one horizontal scanning duration as a duration of signal input to predetermined number of pixel rows includes a duration that can be used as the first duration, the second duration, and the third duration.

5. The liquid crystal display device according to claim 3, wherein, when switching is performed between the first mode and the second mode, one horizontal scanning duration includes at least one of a duration in which the first duration and the second duration are continuous or a duration in which the second duration and the third duration are continuous.

6. The liquid crystal display device according to claim 3, wherein the gradation signal is not output to the pixel in the first duration and the third duration.

7. The liquid crystal display device according to claim 1, wherein the pixel includes a pixel electrode, the gradation signal and the setting signal are transmitted through the signal line, a first scanning line is configured to transmit a first scanning signal indicating whether to couple the pixel electrode and the signal line, and a second scanning line is configured to transmit a second scanning signal indicating whether to couple the memory and the signal line.

8. The liquid crystal display device according to claim 7, further comprising a touch detecting unit configured to detect a touch operation, wherein no signal transmission is performed through the first scanning line and the second scanning line in a touch detection duration in which the touch detecting unit performs the detection of the touch operation.

9. The liquid crystal display device according to claim 3, wherein the pixel includes a fourth switch arranged between the first switch and a pixel electrode, the controller is configured to:

couple the memory and the signal line without turning on the fourth switch to couple the pixel electrode and the first switch, in the first duration and the third duration;

provide the memory with a signal to turn on the first switch in the first duration; and write the setting signal to the memory in the third duration.

10. The liquid crystal display device according to claim 1, wherein the memory is coupled with a wire at a predetermined middle potential, and the setting signal is input to the memory as a signal indicating two values by high and low potentials with respect to the middle potential.

11. The liquid crystal display device according to claim 1, further comprising:

a pixel electrode;

a reference electrode configured to be provided with a reference potential; and a wire, wherein the first switch is configured to switch coupling and non-coupling between the pixel electrode and the signal line, the second switch is configured to switch coupling and non-coupling between the pixel electrode and the wire providing the reference potential, and the controller is configured to:

output the gradation signal to the signal line in the first mode;

output the setting signal to the signal line in the second mode;

couple the pixel electrode and the signal line without coupling the pixel electrode and the wire by turning on the first switch in the first mode or when the pixel is provided with a voltage different from the reference potential in the second mode; and couple the pixel electrode and the wire without coupling the pixel electrode and the signal line by turning on the second switch when the pixel is provided a voltage equal to the reference potential in the second mode.

12. The liquid crystal display device according to claim 11, wherein, in the first mode, a sign of the reference potential is inverted in each horizontal scanning duration, and in the second mode, the sign of the reference potential is inverted in each vertical scanning duration.

13. A liquid crystal display device comprising:

a pixel electrode;

a reference electrode configured to be supplied with a predetermined reference potential;

a signal line configured to provide a gradation signal, a setting signal, and a first signal that is different from the predetermined reference potential;

a wire;

a first switch including a first gate and being configured to switch coupling and non-coupling between the pixel electrode and the signal line;

a second switch including a second gate and being configured to switch coupling and non-coupling between the pixel electrode and the wire providing the predetermined reference potential; and a memory coupled to the first gate and the second gate and configured to store a setting signal, wherein one of the first switch or the second switch is configured to be turned on and the other of the first switch or the second switch is configured to be turned off depending on the setting signal stored in the memory, and the setting signal is written to the memory before a start of a first mode in which the gradation signal is applied to the pixel electrode through the first switch and before a start of a second mode in which one of the reference potential and the first signal is applied to the pixel electrode depending on the setting signal.

* * * * *